US009684919B2

(12) United States Patent
Apsley et al.

(10) Patent No.: US 9,684,919 B2
(45) Date of Patent: Jun. 20, 2017

(54) ITEM DELIVERY USING 3D MANUFACTURING ON DEMAND

(71) Applicant: Amazon Technologies, Inc., Reno, NV (US)

(72) Inventors: Linda Knowlton Apsley, Sammamish, WA (US); Colin Ian Bodell, Seattle, WA (US); Jacob Conrad Danton, Bellevue, WA (US); Scott Randall Hayden, Woodinville, WA (US); SaiPrasad Kapila, Redmond, WA (US); Eric Lessard, Goodyear, AZ (US); Robert Benjamin Uhl, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 774 days.

(21) Appl. No.: 14/076,119

(22) Filed: Nov. 8, 2013

(65) Prior Publication Data
US 2015/0052023 A1 Feb. 19, 2015

Related U.S. Application Data

(60) Continuation-in-part of application No. 13/799,877, filed on Mar. 13, 2013, now Pat. No. 9,159,106, (Continued)

(51) Int. Cl.
*G06Q 30/00* (2012.01)
*G06Q 30/06* (2012.01)
(Continued)

(52) U.S. Cl.
CPC ..... *G06Q 30/0621* (2013.01); *B29C 67/0051* (2013.01); *B29C 67/0085* (2013.01);
(Continued)

(58) Field of Classification Search
CPC    G06Q 30/0601–30/0643; G06Q 30/08; B29C 39/00; B29C 67/0051;
(Continued)

(56) References Cited

U.S. PATENT DOCUMENTS 5,452,374 A    9/1995 Cullen et al.
5,497,236 A    3/1996 Wolff et al.
(Continued)

FOREIGN PATENT DOCUMENTS

WO    2007/065087    6/2007
WO    2013036942 A1    3/2013

OTHER PUBLICATIONS

3D Content Central. [online] www.3dcontentcentral.com, Feb. 27, 2009 [Feb. 9, 2009]. Retrieved from the Internet: <URL: www.archive.org>.
(Continued)

*Primary Examiner* — William Allen
(74) *Attorney, Agent, or Firm* — Kilpatrick Townsend & Stockton

(57) ABSTRACT

Methods and systems can be provided for providing items manufactured on demand to users. A user request for an item can be received. The item can have 3D manufacturing instructions associated therewith. A delivery method for the item can be determined. A manufacturing apparatus can be selected to manufacture the item based on the 3D manufacturing instructions. Instructions can be sent to the manufacturing apparatus to manufacture the item based on the 3D manufacturing instructions. Delivery instructions can be provided for delivering the item according to the delivery method.

16 Claims, 29 Drawing Sheets

Related U.S. Application Data which is a division of application No. 12/890,334, filed on Sep. 24, 2010, now Pat. No. 8,412,588.

(51) Int. Cl.
*G06F 17/50* (2006.01)
*B29C 67/00* (2017.01)
*G06Q 10/08* (2012.01)

(52) U.S. Cl.
CPC .......... *G06F 17/50* (2013.01); *G06F 17/5009* (2013.01); *G06Q 10/08* (2013.01); *G06Q 10/0836* (2013.01); *G06Q 30/0619* (2013.01); *G06Q 30/0635* (2013.01); *G06Q 30/0643* (2013.01)

(58) Field of Classification Search
CPC ............ B29C 67/0055; B29C 67/0074; B29C 67/0077; B29C 67/0085; B29C 67/0088; G06F 17/50; G06F 17/5009; G06F 17/5086; B33Y 10/00; B33Y 30/00; B33Y 50/02; B33Y 50/00; B33Y 40/00; B33Y 99/00
See application file for complete search history.

(56) References Cited

U.S. PATENT DOCUMENTS

| | | |
|---|---|---|
| 5,731,884 A | 3/1998 | Inoue |
| 5,901,253 A | 5/1999 | Tretter |
| 6,031,612 A | 2/2000 | Shirley |
| 6,507,670 B1 | 1/2003 | Moed |
| 6,954,290 B1 | 10/2005 | Braudaway et al. |
| 6,965,440 B1 | 11/2005 | Nakagiri et al. |
| 7,006,952 B1 | 2/2006 | Matsumoto et al. |
| 7,016,536 B1 | 3/2006 | Ling et al. |
| 7,031,519 B2 | 4/2006 | Elmenhurst |
| 7,145,699 B2 | 12/2006 | Dolan |
| 7,639,386 B1 | 12/2009 | Siegel et al. |
| 7,668,404 B2 | 2/2010 | Adams et al. |
| 8,286,236 B2 | 10/2012 | Jung et al. |
| 8,412,588 B1 | 4/2013 | Bodell et al. |
| 8,429,754 B2 | 4/2013 | Jung et al. |
| 8,752,166 B2 | 6/2014 | Jung et al. |
| 9,195,959 B1* | 11/2015 | Lopez .................... G06Q 10/08 |
| 2002/0072979 A1 | 6/2002 | Sinha et al. |
| 2002/0107751 A1 | 8/2002 | Rajagopalan et al. |
| 2003/0072031 A1 | 4/2003 | Kuwata et al. |
| 2005/0068178 A1* | 3/2005 | Lee ........................ G06Q 10/08 340/569 |
| 2005/0093865 A1 | 5/2005 | Jia |
| 2005/0102240 A1 | 5/2005 | Misra et al. |
| 2005/0244060 A1 | 11/2005 | Nagarajan et al. |
| 2007/0244763 A1 | 10/2007 | Williams et al. |
| 2008/0111816 A1 | 5/2008 | Abraham et al. |
| 2009/0086275 A1 | 4/2009 | Liang et al. |
| 2009/0164379 A1 | 6/2009 | Jung et al. |
| 2009/0165127 A1 | 6/2009 | Jung et al. |
| 2009/0254457 A1 | 10/2009 | Folsom |
| 2009/0303507 A1 | 12/2009 | Abeloe |
| 2010/0030608 A1 | 2/2010 | Kaminsky et al. |
| 2010/0031351 A1 | 2/2010 | Jung et al. |
| 2010/0088175 A1 | 4/2010 | Lundquist |
| 2010/0287065 A1 | 11/2010 | Alivandi |
| 2010/0299222 A1 | 11/2010 | Hamilton, IV et al. |
| 2011/0087350 A1 | 4/2011 | Fogel et al. |
| 2011/0153052 A1 | 6/2011 | Pettibone et al. |
| 2011/0246331 A1 | 10/2011 | Luther et al. |
| 2011/0282476 A1 | 11/2011 | Hegemier et al. |
| 2011/0313878 A1 | 12/2011 | Norman |
| 2012/0078592 A1 | 3/2012 | Sims, Jr. |
| 2012/0221438 A1* | 8/2012 | Cook, Jr. ............... G06Q 10/10 705/26.61 |
| 2013/0006739 A1 | 1/2013 | Horvitz et al. |
| 2013/0218446 A1 | 8/2013 | Bradley et al. |
| 2013/0262251 A1 | 10/2013 | Wan et al. |
| 2014/0031964 A1* | 1/2014 | Sidhu ............... G05B 19/41865 700/99 |
| 2014/0040065 A1* | 2/2014 | DuBois .............. G06Q 30/0621 705/26.5 |
| 2014/0058959 A1 | 2/2014 | Isbjornssund et al. |
| 2014/0089073 A1 | 3/2014 | Jacobs et al. |
| 2014/0156053 A1 | 6/2014 | Mahdavi et al. |
| 2014/0200697 A1 | 7/2014 | Cheng et al. |
| 2014/0214684 A1 | 7/2014 | Pell et al. |
| 2014/0244433 A1* | 8/2014 | Cruz .................. G06Q 30/0633 705/26.8 |
| 2014/0283104 A1 | 9/2014 | Nilsson et al. |
| 2015/0112837 A1 | 4/2015 | O'dea |

OTHER PUBLICATIONS

3D Design Premium. [online] SolidWorks, Jul. 11, 2012. Retrieved from the Internet: <URL: http://solidworks.com/sw/products/mechanical-engineering-cad-software.htm>, 1 page.

Baird, H.S., "Difficult and Urgent Open Problems in Document Image Analysis for Libraries," International Workshop on Document Image Analysis for Libraries, Jan. 2004, 8 pages.

Charleton, G. "Printing in Three Dimensions," [online] Discovery Communications, LLC, Sep. 10, 2010. Retrieved from the Internet: <URL: http://news.discovery.com/tech/printing-in-3d.html>, 9 pages.

Cinque et al., "Segmentation of Pages Images Having Artifacts of Photocopying and Scanning," Pattern Recognition Society, May 2002, 11 pages.

Custom Gifts. [online] Café Press, Oct. 25, 2010. Retrieved from the Internet <URL: http://cafepress.com/make/personalized-gifts>, 3 pages.

Custom T-Shirts [online] Café Press, Oct. 25, 2010. Retrieved from the Internet <URL: http://cafepress.com/make/custom-t-shirts>, 4 pages.

Fan et al., "A Comprehensive Image Processing Suite for Book Re-mastering," International Conference on Document Analysis and Recognition, Aug. 2005, 5 pages.

Find Free CAD Drawings, 3D Models on 3D ContnetCentral, [online] 3D Content Central, Jul. 11, 2012. Retrieved from the Internet: <URL: http://www.3dcontentcentral.com/Browse.aspx?eventSource=mnuFindContent>, 3 pages.

Free 3D Models, Free CAD Models. [online] 3D Content Central, Jul. 11, 2012. Retrieved from the Internet: <URL: http://www.3dcontentcentral.com/default.aspx>, 4 pages.

Le Bourgeois et al., "Document Images Analysis Solutions for Digital Libraries," International Workshop on Document Image Analysis for Libraries, Jan. 2004, 23 pages.

My 3D Content Central. [online] 3D Content Central, Jul. 11, 2012. Retrieved from the Internet: <URL: http://www.3dcontentcentral.com/My3DCC.aspx?ReturnUrl=%2default.aspx>, 1 page.

Perez, Sarah. "eBay Is Latest to Join 3D Printing Craze With New App for Customizable Goods, eBay Exact," [online] TechCrunch, Jul. 2013 [retrieved on Nov. 6, 2013]. Retrieved from the Internet: <URL: http://techcrunch.com/2013/07/12/ebay-is-latest-to-join-3d-printing-craze-with-new-app-for-customizable-goods-ebay-exact/>, Photo Mugs: Personalized Mugs and Custom Mugs. [online] Café Press, Oct. 25, 2010. Retrieved from the Internet <URL: http://cafepress.com/make/custom-mugs>, 2 pages.

Simulation Premium. [online] SolidWorks, Jul. 11, 2012. Retrieved from the Internet: <URL: http://www.solidwors.com/sw/products/10172.ENU_HTML.htm>, 1 page, SolidWorks Premium 2010—The Complete 3D CAD Solution for Designing Better Product. Product Description, 2010, 4 pages.

Thingiverse: Digital Designs for Physical Objects. [online]. MakerBot® Industries, 2013 [retrieved on Nov. 6, 2013]. Retrieved from the Internet: <URL: http://www.thingiverse.com/ >.

Vance, A., "3-D Printing Spurs a Manufacturing Revolution," [online] New York Times.com, Sep. 13, 2010. Retrieved from the

(56) References Cited

OTHER PUBLICATIONS

Internet: <URL: http://www.nytimes.com/2010/09/14/technology/14print.html?_r=1&pagewanted=print>, 4 pages.
U.S. Appl. No. 13/799,877, filed Mar. 13, 2013, Titled: Systems and Methods for Fabricating Products on Demand.
U.S. Appl. No. 14/076,128, filed Nov. 8, 2013, Titled: Vendor Interface for Item Delivery via 3D Manufacturing on Demand.
U.S. Appl. No. 14/076,127, filed Nov. 8, 2013, Titled: Providing Services Related to Item Delivery via 3D Manufacturing on Demand.
U.S. Appl. No. 14/076,133, filed Nov. 8, 2013, Titled: Fulfillment of Orders for Items Using 3D Manufacturing on Demand.
U.S. Appl. No. 14/076,135, filed Nov. 8, 2013, Titled: Customization and Other Features for Item Delivery via 3D Manufacturing on Demand.
Customize your own parts through a single model on Parametric Parts. [online]. 3ders.org, Mar. 22, 2013. Retrieved from the Internet: < http://www.3ders.org/articles/20130322-customize-and-3d-print-your-own-parts-through-a-single-model-on-parametric-parts-platform.html>, 6 pages.
U.S. Appl. No. 13/799,877, "Non-Final Office Action", mailed Feb. 20, 2015, 9 pages.
PCT/US2014/064878, "International Search Report and Written Opinion", mailed Feb. 4, 2015, 10 pages.
PCT/US2014/064880, "International Search Report and Written Opinion", mailed Feb. 4, 2015, 9 pages.
U.S. Appl. No. 13/799,877, "Notice of Allowance," mailed Jun. 24, 2015, 10 pages.
U.S. Appl. No. 14/848,098, filed Sep. 8, 2015, Titled: Fabrication of Products on Demand.
U.S. Appl. No. 12/890,334, Non-Final Office Action mailed on Aug. 13, 2012, 17 pages.
U.S. Appl. No. 12/890,334, Notice of Allowance mailed on Dec. 5, 2012, 8 pages.
U.S. Appl. No. 12/890,334, Restriction Requirement mailed on Jun. 13, 2012, 7 pages.
Finegold, Sam, "Amazon Will Seize 3D Printing," [online]. Harvard Political Review, Aug. 2012 [retrieved on Apr. 12, 2013]. Retrieved from the Internet: <URL: http://harvardpolitics.com/specialty-blogs/juncture/amazon-will-seize-3d-printing/>, 2 pages.
Shapeways—Make & Share Your Products with 3D Printing. [online]. Shapeways, Inc., Apr. 2013 [retrieved on Apr. 12, 2013]. Retrieved from the Internet: <URL: http://www.shapeways.com/about/how_does_it_work?li=home-learnmore>, 4 pages.
U.S. Appl. No. 14/076,128 , "Non-Final Office Action", Oct. 21, 2016, 37 pages.
U.S. Appl. No. 14/076,133 , "Non Final Office Action", Oct. 26, 2016, 30 pages.
U.S. Appl. No. 14/076,135 , "Non-Final Office Action", Nov. 4, 2016, 37 pages.

* cited by examiner

ITEM DELIVERY USING 3D MANUFACTURING ON DEMAND

CROSS-REFERENCE TO RELATED APPLICATIONS

This application is a Continuation-in-Part of U.S. Pat. No. 9,159,106, filed Mar. 13, 2013 and issued on Oct. 13, 2015, entitled "SYSTEMS AND METHODS FOR FABRICATING PRODUCTS ON DEMAND, which is a Division of U.S. Pat. No. 8,412,588, filed Sep. 24, 2010 and issued on Apr. 2, 2013, entitled "SYSTEMS AND METHODS FOR FABRICATING PRODUCTS ON DEMAND," which are incorporated herein by reference in their entireties.

This application is also related to and incorporates by reference for all purposes the full disclosure of co-pending U.S. patent application Ser. No. 14/076,128, filed concurrently herewith, entitled "VENDOR INTERFACE FOR ITEM DELIVERY VIA 3D MANUFACTURING ON DEMAND", co-pending U.S. patent application Ser. No. 14/076,127, filed concurrently herewith, entitled "PROVIDING SERVICES RELATED TO ITEM DELIVERY VIA 3D MANUFACTURING ON DEMAND", co-pending U.S. patent application Ser. No. 14/076,133, filed concurrently herewith, entitled "FULFILLMENT OF ORDERS FOR ITEMS USING 3D MANUFACTURING ON DEMAND", co-pending U.S. patent application Ser. No. 14/076,135, filed concurrently herewith, entitled "CUSTOMIZATION AND OTHER FEATURES FOR ITEM DELIVERY VIA 3D MANUFACTURING ON DEMAND".

BACKGROUND

In the modern age of e-commerce, many items are bought or sold electronically. To facilitate such an electronic transaction, a service provider may provide a network site or other electronic marketplace through which a customer can select and order an item. The item may be one of many items offered by the electronic marketplace. The electronic marketplace may have systems for identifying the selected item and ensuring that it is delivered to the customer. The multiplicity of items offered may require the electronic marketplace owner/operator to maintain a large inventory requiring sufficient space to store the inventory. An electronic marketplace may also face the challenge of time delays related to the process of finding the selected item among a large inventory. Increased space to store additional inventory may raise costs for the electronic marketplace. Additionally, time delays between receiving an order and shipping the item to the customer may reduce customer satisfaction and affect revenues generated. Accordingly, an electronic marketplace may find it desirable to decrease the amount of warehouse or inventory storage space needed, to reduce the amount of time consumed between receiving an order and delivering the item to the customer, or both.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Introduction

Techniques described herein include systems for providing items manufactured on demand to users. For example, a user can submit an order for an item offered in an electronic marketplace and request that the item be manufactured on demand by a manufacturing apparatus, e.g., a three-dimensional (3D) manufacturing apparatus. As may be appreciated, the term "manufacture" connotes production of a physical object. A service provider system can receive the order and access instructions for manufacturing the item by a manufacturing apparatus. The service provider system may interact with one or more suppliers to obtain the manufacturing instructions. The service provider system can provide the manufacturing instructions to the user so that the user can make the ordered item using the user's own manufacturing apparatus. Alternatively, the service provider system can utilize the manufacturing instructions to make the ordered item using a manufacturing apparatus maintained by the service provider. The item made on the manufacturing apparatus maintained by the service provider can be delivered to the user or to a location for pick-up by the user based on instructions provided by the service provider system.

Figure 1:
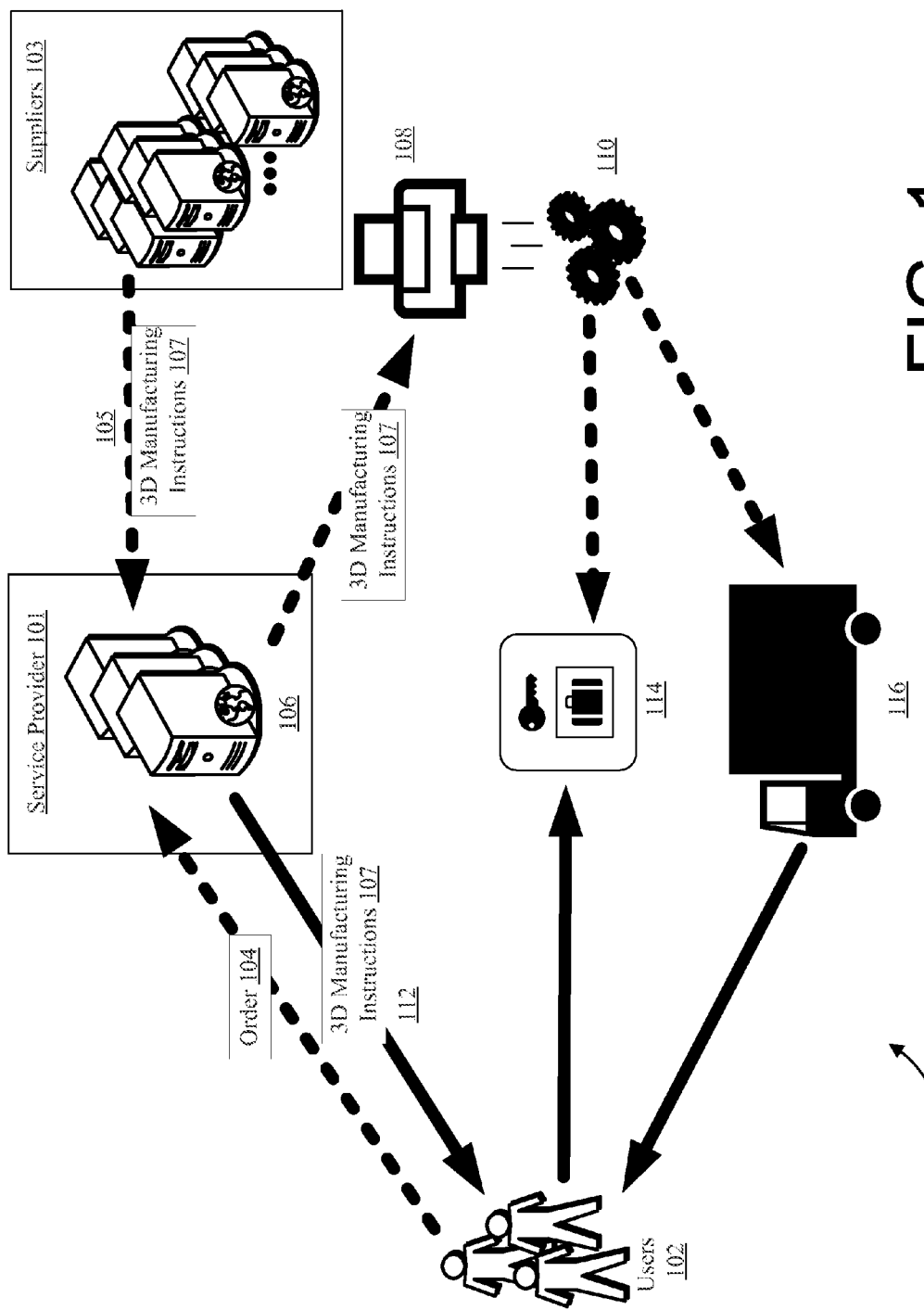
FIG. 1 is a schematic diagram showing an example system for providing one or more Manufactured-On-Demand (MOD) items to users via computer systems of a service provider in accordance with embodiments.

FIG. 1 shows an example system 100 for providing one or more Manufactured-On-Demand (MOD) items 110 to users 102 via computer systems 106 of a service provider 101. A user 102 can submit an order 104 via computer systems 106 of the service provider 101. The computer systems 106 of the service provider 101 can provide 3D manufacturing instructions 107 to have the ordered item manufactured by a 3D manufacturing apparatus 108 as a MOD item 110. In some aspects, the 3D manufacturing apparatus 108 may include a 3D printer or some other on-demand 3D manufacturing apparatus(es) 108 described herein.

The 3D manufacturing apparatus 108 may utilize any manufacturing technique that can be used to produce a three-dimensional physical object based on the 3D manufacturing instructions 107. Both additive and subtractive manufacturing processes can be utilized. For example, manufacturing techniques can include fused deposition modeling, electron beam freeform fabrication, direct metal laser sintering, electron beam melting, selective laser melting, selective heat sintering, selective laser sintering, laminated object manufacturing, stereo lithography, digital light processing, and any 3D printing, including plaster-based, powder bed, and inkjet head 3D printing. Manufacturing techniques may also include automation of machine tools based on a digital model such as in computer numerical control (or CNC) techniques.

The 3D manufacturing instructions 107 can include any type of data and/or instructions that can be used by a 3D manufacturing apparatus 108 to make an item. The 3D manufacturing instructions 107 can include any data or instructions utilized in producing a physical object based on a digital model or data of the object. In one example, 3D manufacturing instructions 107 may include combinations of dimensions, tolerances, and/or other part specifications that sufficiently describe the attributes of an item such that the item can be physically produced by a 3D manufacturing apparatus 108. In another example, 3D manufacturing instructions 107 may include digital models such as may be provided by Computer-Aided-Design (CAD) files or files for computer modeling programs. In another example, 3D manufacturing instructions 107 may include files in STL, PLY, or VRML formats, to name a few. In another example, 3D manufacturing instructions 107 may also include files representing cross sections of digital models referenced for building physical models one layer at a time. In another example, 3D manufacturing instructions 107 may also include executable code providing specific sequential instructions for controlling a 3D manufacturing apparatus 108 to produce a physical object.

In embodiments, the computer systems 106 of the service provider 101 can provide for an electronic marketplace. An electronic marketplace can be a virtual market for buyers and sellers implemented through a network. An electronic marketplace can provide an interface for sellers such that a plurality of sellers can provide items to be listed for consumption in the virtual market. An electronic marketplace can also provide an interface for buyers such that buyers may select and order from among the listed items. In embodiments, buyers and sellers can include users 102 and suppliers 103. For example, users 102 can submit orders 104 for items listed in the electronic marketplace. In embodiments, the suppliers 103 can provide physical items for fulfilling orders 104 and/or the suppliers 103 can provide 3D manufacturing instructions 107 (as at 105) that can be used to produce order-fulfilling MOD items 110 on-demand via a 3D manufacturing apparatus 108. In embodiments, orders 104 by users 102 for items can be fulfilled by providing a MOD item 110 or by providing a non-MOD item. In embodiments, the service provider 101 can also be a supplier 103.

In embodiments, the service provider 101 can instruct delivery of the MOD item 110 to the users 102. One or more delivery options may be provided by the service provider 101. In one aspect, the MOD item 110 may be delivered via a 3D manufacturing apparatus 108 owned by the user 102, as at 112. For example, the 3D manufacturing instructions 107 can be provided directly to the user 102, and the MOD item 110 may be produced, using the 3D manufacturing instructions 107, on a 3D printer at the home or office of the user 102. In other aspects, a 3D manufacturing apparatus 108 not owned or controlled by the user 102, but owned or controlled by or otherwise accessible to the service provider 101, may produce the MOD item 110 using the 3D manufacturing instructions 107. As a non-limiting example, the MOD item 110 can be produced and stored at a pickup location for the user 102 to retrieve at the convenience of the user 102, as at 114. As another non-limiting example, the MOD item 110 can be printed or manufactured—for example using a 3D manufacturing apparatus 108 located in a warehouse or on a truck owned by the service provider 101—and then delivered to the user 102 according to delivery instructions provided by the user 102, as at 116.

An illustrative example of the operation of the system 100 depicted in FIG. 1 follows. A faucet handle breaks off while a person (the user 102 in this illustrative example) is cleaning up after dinner, making adjustment of the water pressure/temperature difficult. The user 102 utilizes his or her smartphone to access an electronic marketplace network page (provided by the computer systems 106 of a service provider 101 in this example). The user 102 locates the replacement faucet handle on the network page, and places an order (i.e., 104 in FIG. 1) for the faucet handle, requesting remote pick-up. Upon completing the order 104, the user 102 departs for the pick-up location indicated by the website. Meanwhile, the computer systems 106 retrieve a digital 3D model of the faucet handle from a database maintained by the original vendor of the faucet (i.e., interact with a supplier 103 at 105 to obtain 3D manufacturing instructions 107). The computer systems 106 then convert the 3D model into printing instructions for a 3D printer (i.e., the 3D manufacturing instructions 107 for the 3D manufacturing apparatus 108). The printing instructions are used to produce the faucet handle as a MOD item 110 by a 3D printer located at a storage facility while the user 102 is en route. The MOD item 110 is picked up (i.e., 114) by the user 102 and immediately installed to replace the broken faucet handle, thereby quickly resolving the faucet issue.

System Architecture

Figure 2:
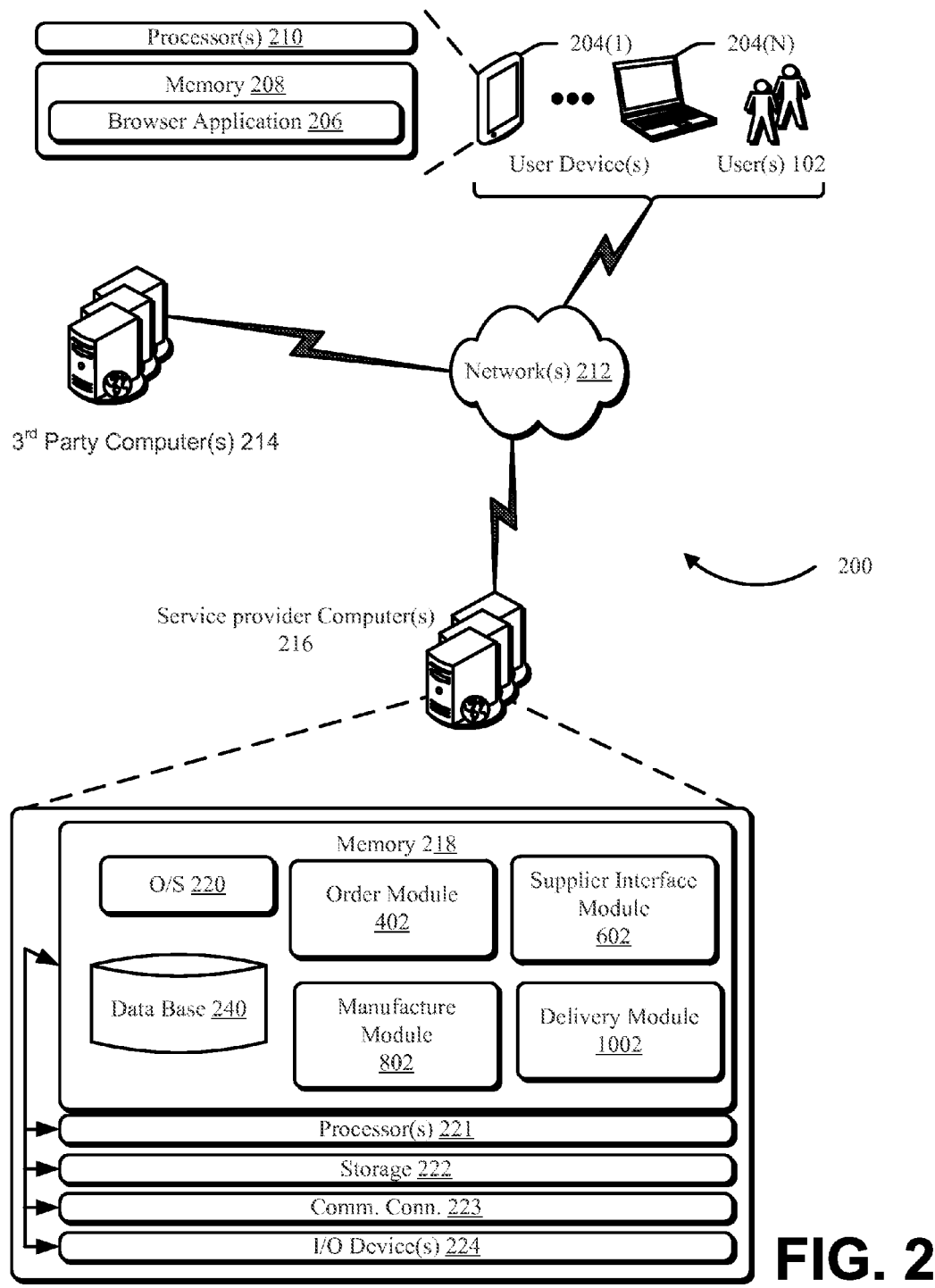
FIG. 2 is a schematic diagram depicting an illustrative system or architecture in which techniques for providing one or more MOD items to users via computer systems may be implemented in accordance with embodiments.

FIG. 2 depicts an illustrative system or architecture 200 in which techniques for providing one or more MOD items 110 to users 102 via computer systems 106 may be implemented. In architecture 200, one or more users 102 may utilize user computing devices 204(1)-(N) (collectively, user devices 204) to access a browser application 206 (e.g., a web browser) or a user interface (UI) accessible through the browser application 206, via one or more networks 212. The "browser application" 206 can be any browser control or native application that can access and display a network page or other information. In some aspects, the browser application 206 may be hosted, managed, and/or provided by a computing resources service or service provider, such as by utilizing one or more service provider computers 216. The one or more service provider computers 216 may, in some examples, provide computing resources such as, but not limited to, client entities, low latency data storage, durable data storage, data access, management, virtualization, hosted-computing-system-based software solutions, electronic content performance management, etc. The one or more service provider computers 216 may also be operable to provide web or network hosting, computer application development, and/or implementation platforms, combinations of the foregoing, or the like to the one or more users 102.

In one illustrative configuration, the user devices 204 may include at least one memory 208 and one or more processing units or processor(s) 210. The processor(s) 210 may be implemented as appropriate in hardware, computer-executable instructions, firmware, or combinations thereof. Computer-executable instruction or firmware implementations of the processor(s) 210 may include computer-executable or machine-executable instructions written in any suitable programming language to perform the various functions described. The user devices 204 may also include geo-location devices (e.g., a global positioning system (GPS) device or the like) for providing and/or recording geographic location information associated with the user devices 204.

The memory 208 may store program instructions that are loadable and executable on the processor(s) 210, as well as data generated during the execution of these programs. Depending on the configuration and type of user device 204, the memory 208 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 208 may include multiple different types of memory, such as static random access memory (SRAM), dynamic random access memory (DRAM), or ROM.

Turning to the components of the memory 208 in more detail, the memory 208 may include an operating system and one or more application programs or services for implementing the features disclosed herein via the browser application 206 or dedicated applications (e.g., smart phone applications, tablet applications, etc.). The browser application 206 may be configured to receive, store, and/or display a website, a link to an electronic marketplace, or other interface for interacting with the one or more service provider computers 216. Additionally, the memory 208 may store access credentials and/or other user information such as, but not limited to, user IDs, passwords, and/or other user information. In some examples, the user information may include information for authenticating an account such as, but not limited to, a device ID, a cookie, an IP address, a location, or the like. In addition, the user information may include a user 102 provided response to a security question or a geographic location obtained by the user device 204.

In some examples, the networks 212 may include any one or a combination of many different types of networks, such as cable networks, the Internet, wireless networks, cellular networks and other private and/or public networks. While the illustrated example represents the users 102 accessing the browser application 206 over the networks 212, the described techniques may equally apply in instances where the users 102 interact with the one or more service provider computers 216 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the browser application 206 may allow the users 102 to interact with the one or more service provider computers 216 (e.g., the computer systems 106 of the service provider 101), such as to access content like webpages or network pages. The one or more service provider computers 216, perhaps arranged in a cluster of servers or as a server farm, may host the browser application 206 and/or cloud-based software services. Other server architectures may also be used to host the browser application 206 and/or cloud-based software services. The browser application 206 may be capable of handling requests from many users 102 and serving, in response, various user interfaces that can be rendered at the user devices 204 such as, but not limited to, a webpage, a website, network site, or network page. The browser application 206 can interact with any type of website or network site that supports user interaction, including social networking sites, electronic retailers, informational sites, blog sites, search engine sites, news and entertainment sites, and so forth. The described techniques can similarly be implemented outside of the browser application 206, such as with other applications running on the user device 204.

The one or more service provider computers 216 may be any type of computing device such as, but not limited to, a mobile phone, a smart phone, a personal digital assistant (PDA), a laptop computer, a desktop computer, a server computer, electronic book (e-book) reader, a thin-client device, a tablet PC, etc. Additionally, it should be noted that in some embodiments, the one or more service provider computers 216 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment. In some examples, the one or more service provider computers 216 may be in communication with the user device 204 via the networks 212, or via other network connections. The one or more service provider computers 216 may include one or more servers, perhaps arranged in a cluster or as individual servers not associated with one another. The one or more service provider computers 216 may be in communication with one or more third party computers 214 via networks 212. The one or more service provider computers 216 that host the browser application 206 may obtain and provide data to third party computers 214 via networks 212 in accordance with embodiments described herein.

In one illustrative configuration, the one or more service provider computers 216 may include at least one memory 218 and one or more processing units or processors(s) 221. The processor(s) 221 may be implemented as appropriate in hardware, computer-executable instructions, firmware, or combinations thereof. Computer-executable instruction or firmware implementations of the processor(s) 221 may include computer-executable or machine-executable instructions written in any suitable programming language to perform the various functions described. The memory 218 may store program instructions that are loadable and executable on the processor(s) 221, as well as data generated during the execution of these programs. Depending on the configuration and type of the one or more service provider computers 216, the memory 218 may be volatile (such as RAM) and/or non-volatile (such as ROM, flash memory, etc.). The one or more service provider computers 216 or servers may also include additional storage 222, which may include removable storage and/or non-removable storage. The additional storage 222 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 218 may include multiple different types of memory, such as SRAM, DRAM, or ROM.

The memory 218, the additional storage 222, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 218 and the additional storage 222 are all examples of computer storage media. Additional types of computer storage media that may be present in the one or more service provider computers 216 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium, which can be used to store the desired information and which can be accessed by the one or more service provider computers 216. Combinations of any of the above should also be included within the scope of computer-readable media.

The one or more service provider computers 216 may also contain communication connection(s) 223 that allow the one or more service provider computers 216 to communicate with a stored database, another computing device or server, user terminals and/or other devices on the networks 212. The one or more service provider computers 216 may also include I/O device(s) 224, such as a keyboard, a mouse, a pen, a voice input device, a touch input device, a display, speakers, a printer, etc.

Turning to the contents of the memory 218 in more detail, the memory 218 may include an operating system 220, one or more data stores 240 and/or one or more application programs, services, or other software modules, which are generally executed by a processor (e.g., the processors 210 and/or 221) for implementing the features disclosed herein.

Example modules are shown in FIG. 2, but functions and embodiments described herein can utilize a subset of the features provided by the modules and/or additional functions can be provided. Additionally, while the example modules will now be briefly discussed with regard to FIG. 2, further specific details regarding the example modules are provided below in the descriptions of subsequent Figures.

As an example module of memory 218, an order module 402 can be provided for receiving and/or processing orders 104 for MOD items 110. A supplier interface module 602 can be provided for interfacing with suppliers 103 of 3D manufacturing instructions 107 associated with MOD items 110. A manufacture module 802 can be provided for providing instructions, for example to the 3D manufacturing apparatus 108, for manufacturing one or more MOD item(s)

110. A delivery module 1002 can be provided for coordinating delivery of the MOD item 110 to the user 102.

Figure 3:
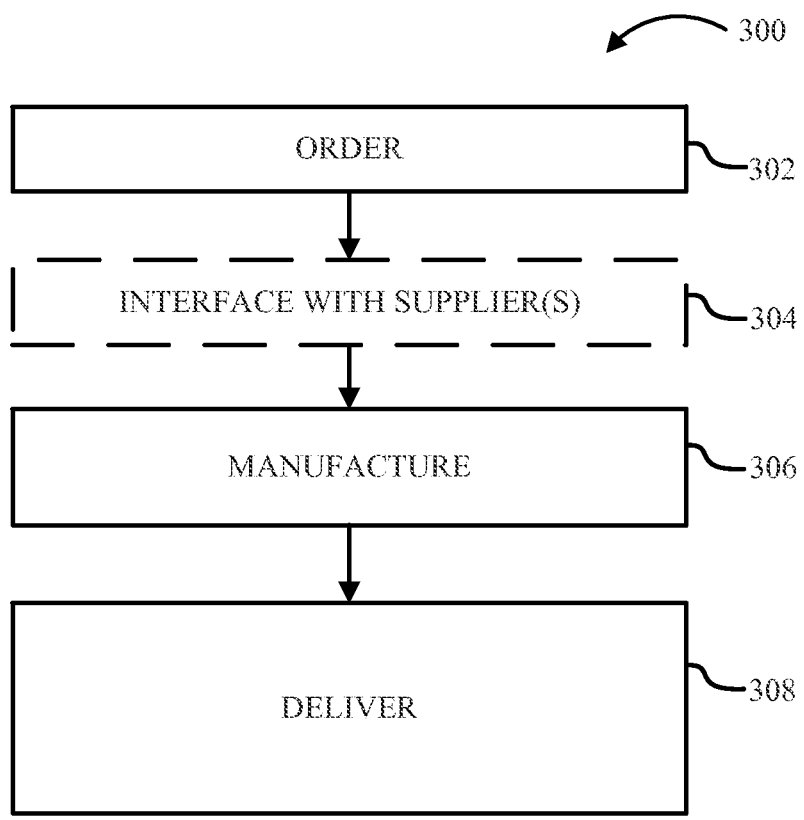
FIG. 3 is a flow chart representing a process for providing MOD items to users in accordance with embodiments.

FIG. 3 is a flow chart representing a process 300 for providing MOD items 110 to users 102 in accordance with some embodiments. Some or all of the process 300 (or any other processes described herein, or variations and/or combinations thereof) may be performed under the control of one or more computer systems configured with executable instructions, such as the modules described herein, and may be implemented as code (e.g., executable instructions, one or more computer programs or one or more applications) executing collectively on one or more processors, by hardware or combinations thereof. The code may be stored on a computer-readable storage medium, for example, in the form of a computer program including a plurality of instructions executable by one or more processors. The computer-readable storage medium may be non-transitory. Moreover, unless indicated otherwise, acts shown in the processes are not necessary performed in the order shown, and/or some acts can be omitted in embodiments.

The process 300 includes an order operation 302, an interface with supplier(s) operation 304, a manufacture operation 306 and a deliver operation 308. In the order operation 302, the order module 402 (e.g., of FIGS. 2, 4) can receive and/or process an order 104, for example received from a user 102 via a user device 204. In operation 304, the supplier interface module 602 (e.g., of FIGS. 2, 6) can communicate with third party computers 214 associated with suppliers 103 of 3D manufacturing instructions 107 associated with the selected MOD item 110.

As can be understood, the 3D manufacturing instructions 107 may be obtained and stored well prior to receipt of orders 104 from users 102, so that the 3D manufacturing instructions 107 are available when an order 104 is placed. In addition, in embodiments, the supplier interface module 602 is not used and/or operation 304 is omitted. For example, the 3D manufacturing instructions 107 can be generated by the service provider computers 216. In the manufacture operation 306, the manufacture module 802 can prepare instructions for a 3D manufacturing apparatus 108 to produce a MOD item 110. In the deliver operation 308, the delivery module 1002 can provide instructions regarding the delivery of the MOD item 110, including, but not limited to, determining a delivery method for the MOD item 110 (e.g., to provide 3D manufacturing instructions 107 directly to the user 102 as at 112 in FIG. 1; to provide a MOD item 110 at a pick-up location as at 114 FIG. 1; or to ship a MOD item 110 to the user 102 as at 116 in FIG. 1).

Figure 4:
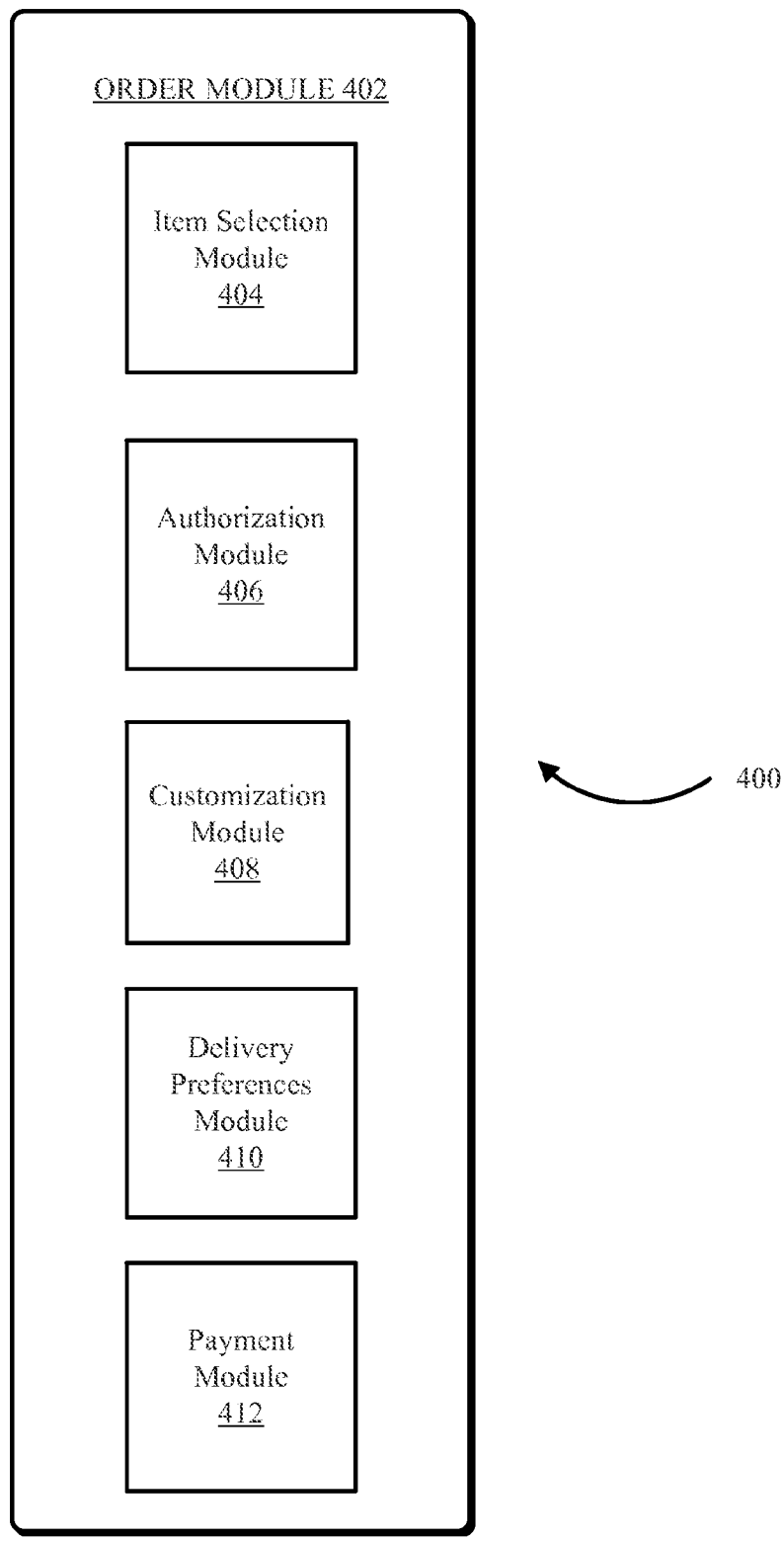
FIG. 4 is a schematic diagram depicting aspects of an example order module in accordance with embodiments.

FIG. 4 depicts aspects of an example order module 402. Order module 402 can include an item selection module 404, an authorization module 406, a customization module 408, a delivery preferences module 410, and/or a payment module 412. The item selection module 404 can be provided for receiving and/or processing a selection by a user 102 of an item provided by the service provider computers 106, which may be, for example, the MOD item 110. An authorization module 406 can be provided for verifying authorization credentials of a user 102. A customization module 408 can be provided for receiving customization options selected by a user 102 for the selected MOD item 110. A delivery preferences module 410 can be provided for receiving delivery preferences of a user 102 for the MOD item 110. A payment module 412 can be provided for receiving payment by a user 102 for the MOD item 110.

Figure 5:
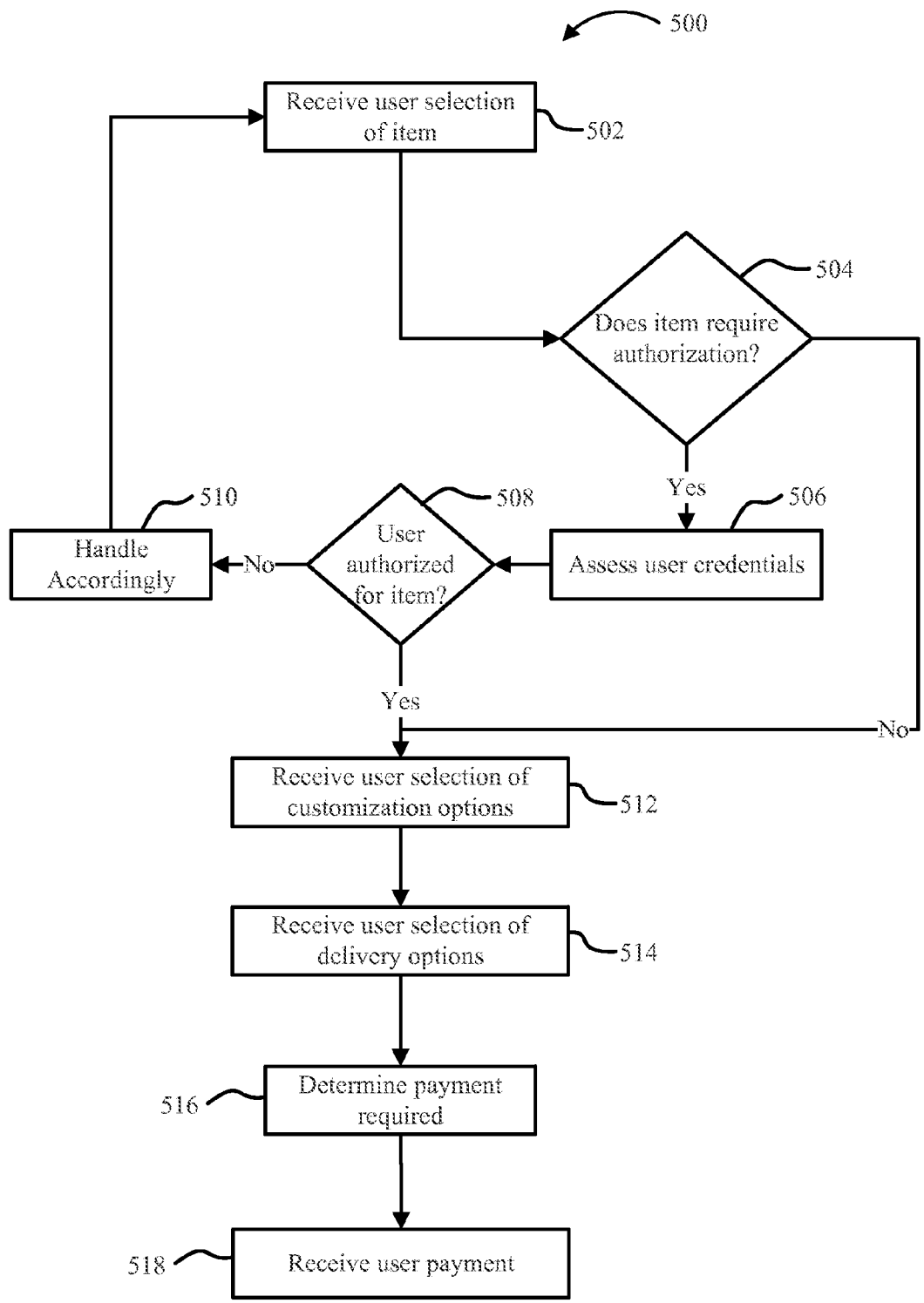
FIG. 5 is a flow chart representing a process that can be executed by the order module for receiving an order of a user for a MOD item in accordance with embodiments.

FIG. 5 is a flow chart representing a process 500 that can be executed by the order module 402 for receiving an order 104 of a user 102 for a MOD item 110. At 502, the order module 402 can receive a selection from a user 102 of a MOD item 110 via the network 212 and/or the user device 204. For example, the user 102 may select a MOD item 110 displayed via the browser application 206 on the user device 204 in the form of a part number, description, and/or image of a MOD item 110, and the item selection module 404 can receive the selection. In some aspects, the order module 402 may provide a user interface for a user 102 to select a subcomponent out of a larger assembly, and the item selection module 404 can receive the selection of the subcomponent as a MOD item 110.

At 504, the authorization module 406 can determine whether or not the selected MOD item 110 requires authorization. For example, a selected MOD item 110 might be a medical device or a firearm or another MOD item 110 of a restricted or regulated category. At 506, if the authorization module 406 determines that the MOD item 110 requires authorization, the authorization module 406 can assess user credentials. For example, the authorization module 406 can compare a license or code number associated with a user 102 to determine if the user 102 is authorized to purchase the MOD item 110. The authorization module 406 can access authorization information utilized at operations 504 and 506—such as authorization requirements and/or user credentials-via a user device 204, a third party computer 214, a service provider computer 216, or any combination thereof.

At operation 508, if the authorization module 406 determines that the user 102 is not authorized for the MOD item 110 (e.g., credentials associated with the user 102 are insufficient for the MOD item 110), the authorization module 406 can proceed to operation 510 and handle accordingly, such as terminate the transaction, request further credentials, send a message to the user 102, or some other handling operation. The process 500 may return to operation 502 after handling so as to provide the user 102 an opportunity to select a different MOD item 110 that does not require the authorization. If the user 102 is authorized to order a MOD item 110 at 508, or if the MOD item 110 does not require authorization at 504, the process 500 can proceed to operation 512.

At operation 512, the customization module 408 can receive a selection of the user 102 of customization options. As non-limiting examples, the customization module 408 can receive one or more user-selected customization options for the MOD item 110 such as size, material, color, text, symbols, logos, or other design modifications to the MOD item 110. The customization module 408 can provide the customization options as a finite list, such as a drop down menu, item selection list, or other options provided by the browser application 206. In some aspects, an additional user interface may be provided for manipulation and customization of a virtual model of the MOD item 110 and the MOD item 110 can be manufactured based on the virtual model, e.g., the 3D manufacturing instructions 107 can be modified to reflect the customized virtual model. Customization may also include customizing all or a part of a selected MOD item 110. As a non-limiting example, a user 102 might select a particular kind of buckle or clasp to be produced as a MOD item 110 and delivered as part of an assembled or unassembled garment or bag. In another non-limiting example, a user 102 may select a particular hinge or fastening device to be manufactured as a MOD item 110 as part of a larger assembly. The larger assembly may or may not include all components that are MOD items 110. A size or other options may also be selected. In some aspects, the customization module 408 can provide for customization based on a functionality requested by the user 102. For example, rather than submitting a request indicating structural changes to a MOD item 110, the user 102 may submit a request specifying functional changes or goals. In a non-limiting example, a user 102 is building a piece of machinery that involves a rotating shaft and a pulley wheel that need to turn at different speeds, but lacks a component to mechanically link the two components. The user 102 utilizes his or her tablet to access an electronic marketplace network page and ultimately selects a generic gear offered as a MOD item 110. In a customization portion of the order, the user 102 requests that the selected gear be modified for attachment to the pulley wheel and interaction with the rotating shaft such that the pulley wheel will turn at a certain fraction of the rotating shaft's speed. The customization module 408 receives the request and interfaces with other modules such that the user 102 can ultimately use his own 3D printer to produce a MOD item 110 that will serve the requested function. In some aspects, customization to match a requested functionality can involve allowing a user 102 to select from multiple designs generated to meet the requested functionality. For example, the multiple designs may be generated by different algorithms accessible to the customization module 408 or by people that received the functionality request via the customization module 408.

At operation 514 in process 500, the delivery preferences module 410 can receive a selection of a user 102 of delivery options. For example, the delivery preferences module 410 may receive preferences of a user 102 as to the time or method of delivery of the MOD item 110. The delivery preferences module 410 may provide a user interface to the user 102 displaying delivery preference options for a user 102 to select and for the delivery preferences module 410 to receive at 514. Non-limiting examples of delivery preferences may include fastest option available, most economic option available, delivery to pick-up or storage location, delivery via vehicle, and delivery via a 3D manufacturing apparatus 108 owned by the user 102. The delivery preferences of a user 102 received by the delivery preferences module 410 may be utilized by delivery module 1002, as discussed in greater detail with regard to FIGS. 10 and 11 below.

At operation 516, the payment module 412 can determine a payment to be assessed for the MOD item 110. The amount of the payment assessed may be determined based on earlier selected options of the user 102 such as, but not limited to, the delivery options selected by the user 102, the customization options selected by the user 102, and/or whether or not the user 102 has an adequate level of authorization to change pricing considerations for the MOD item 110. At operation 518, the payment module 412 can receive a payment of the user 102. For example, the payment module 412 can receive a payment of the user 102 in the form of a credit card payment, a redemption code, a virtual payment service, or any other payment type.

An illustrative example of the process 500 follows. A user 102 may interact with a browser application 206 to order a MOD item 110. In this illustrative example, the MOD item 110 is a trophy. At operation 502, the order module 402 receives the selection by the user 102 via the browser application 206, which indicates the trophy as the selected item. At operation 504, the authorization module 406 determines that a trophy is not a restricted class (No at operation 504) and the process 500 proceeds to operation 512. The customization module 408 provides the user 102 with a number of customization options via the browser application 206. The user 102 is first presented with three customization options for a sport figurine for the top of the trophy: a football player, a tennis player, and a basketball player. Although the selection of the sports figurine could also reflect a user selection of a sports-specific trophy at operation 502, the sports figurine selection is discussed here as a customization option to highlight the versatility of the customization module 408). At operation 512, the customization module 408 receives the selection by the user 102 of the tennis player figurine. The browser application 206 next presents the user 102 with a text field associated with the base of the trophy. Still at operation 512, the customization module 408 receives the user's entry of "MVP 2016". The browser application 206 next presents the user 102 with a virtual model of the trophy. Still at operation 512, the customization module 408 receives the open-ended manipulation of the model by the user 102, including beveling the top four corners of the base and a 20% scale reduction in the size of the trophy. At 514, the delivery preferences module 410 checks to see if the user 102 has a default delivery preference established, and finding none, prompts the user 102 for delivery preferences. The delivery preferences module 410 detects that the user 102 has identified a 3D printer belonging to the user 102 and provides delivery options of print MOD item 110 at home or deliver MOD item 110 via vehicle. At 514, the delivery preferences module 410 receives the selection by the user 102 of print MOD item 110 at home. At 516, the payment module 412 determines the cost associated with printing the trophy at home and the cost adjustments (if any) for the customization of the trophy. At 518, the payment module 412 receives payment from the user 102 from the user's account with the service provider 101.

Figure 6:
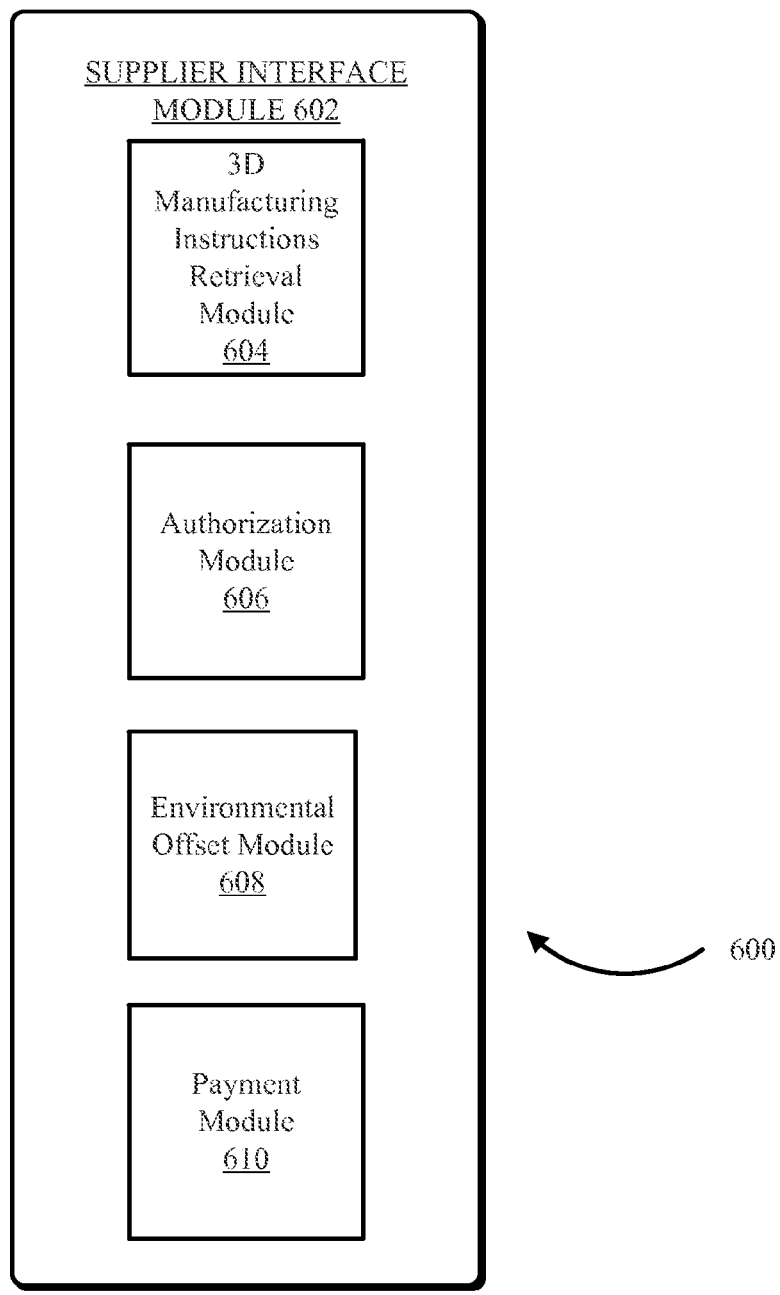
FIG. 6 is a schematic diagram depicting aspects of an example supplier interface module in accordance with embodiments.

FIG. 6 depicts aspects of an example supplier interface module 602. Supplier interface module 602 can include a 3D manufacturing instructions retrieval module 604, an authorization module 606, an environmental offset module 608, and a payment module 610. The 3D manufacturing instructions retrieval module 604 can be provided for retrieving 3D manufacturing instructions 107 associated with a MOD item 110 from a supplier 103 associated with the MOD item 110. The authorization module 606 can be provided for verifying permission from a supplier 103 to utilize 3D manufacturing instructions 107 associated with a MOD item 110 and the supplier 103. For example, the authorization module 606 of the supplier interface module 602 may be associated with permissions imposed by a supplier 103 and may be related to or distinct from permissions associated with the authorization module 406 of the order module 402, which may be imposed by a service provider 101. The environmental offset module 608 can be provided for facilitating environmental offset programs associated with the production of MOD items 110 for suppliers 103 associated with MOD items 110 and participating in the environmental offset program. Non-limiting examples of environmental offset programs include carbon credit programs and energy conservation projects. A payment module 610 can be provided for coordinating payment between a supplier 103 associated with a MOD item 110 and users 102 or the service provider 101.

Figure 7:
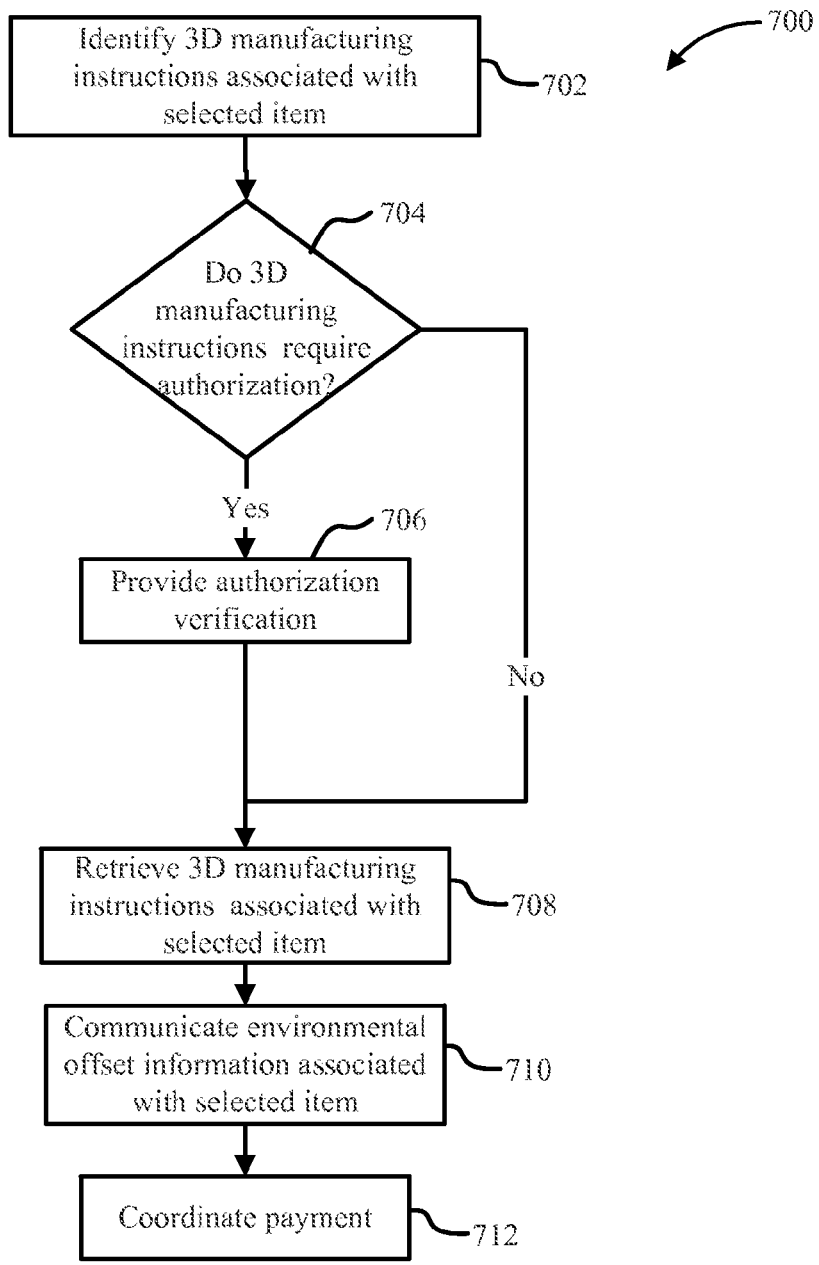
FIG. 7 is a flow chart representing a process that can be executed by the supplier interface module in accordance with embodiments.

FIG. 7 is a flow chart representing a process 700 that can be executed by the supplier interface module 602. At 702, the 3D manufacturing instructions retrieval module 604 can identify 3D manufacturing instructions 107 associated with the selected MOD item 110 that are to be supplied by a third party supplier 103. The selected MOD item 110 can be the same MOD item 110 selected by the user 102 and received at operation 502 as discussed above. 3D manufacturing instructions 107 identified at operation 702 can include base files associated with the MOD item 110 that are provided by suppliers 103 of the MOD item 110. For example, 3D manufacturing instructions 107 identified at 702 can be a part file including specifications for a MOD item 110 from a manufacturer. Alternatively, 3D manufacturing instructions 107 identified at operation 702 may include customization files or options provided for a MOD item 110. The customization files may be provided by a third party and not the service provider 101. The 3D manufacturing instructions retrieval module 604 can interact with third party computers 214 via the network 212 so as to retrieve the 3D manufacturing instructions 107 from third party suppliers 103 identified in operation 702.

At operation 704, the authorization module 606 can determine if the 3D manufacturing instructions 107 require authorization from the supplier 103. For example, the authorization module 606 may determine if the supplier 103 will require authorization to be established on behalf of a user 102 before the supplier 103 will permit 3D manufacturing instructions 107 associated with the supplier 103 to be used to fulfill an order 104 from the user 102 for a MOD item 110. In some embodiments, the supplier 103 may also request that the service provider 101 establish authorization for the service provider 101 to utilize manufacturing instructions 107 associated with the supplier 103. If the 3D manufacturing instructions 107 require authorization at 706, authorization verification can be provided to the supplier 103, such as to third party computers 214. In some aspects, the authorization module 606 can limit the ability of a user 102 to order a MOD item 110 if adequate authorization is not established on behalf of the user 102. In some aspects, the authorization verification is provided by the user 102 to indicate that the user 102 is authorized to utilize the base or customization files being requested from the supplier 103. In alternative aspects, the service provider computers 216 may provide authorization verification regardless of the particular user 102 involved in the transaction. In some embodiments, 3D manufacturing instructions 107 associated with a supplier 103 are stored on service provider computers 216, and authorization provided at 706 permits the service provider 101 to utilize the manufacturing instructions 107 to produce a MOD item 110. In some embodiments, 3D manufacturing instructions 107 associated with a supplier 103 are stored on third party computers 214, and authorization provided at 706 permits the service provider 101 to access the manufacturing instructions 107 via the network 212. When the authorization module 606 has provided authorization verification at 706 or determined that the 3D manufacturing instructions 107 do not require authorization at 704, the process 700 may continue at 708.

At 708, the 3D manufacturing instructions retrieval module 604 can retrieve 3D manufacturing instructions 107 associated with the selected MOD item 110. The 3D manufacturing instructions 107 retrieved may be the 3D manufacturing instructions 107 identified by the 3D manufacturing instructions retrieval module 604 at 702. The 3D manufacturing instructions 107 retrieved at 708 may be subject to authorization at 704 or not subject to authorization at 704. The 3D manufacturing instructions 107 retrieved at 708 can include encrypted data for securing the 3D manufacturing instructions 107 and/or preventing improper copying.

At operation 710, the environmental offset module 608 can communicate environmental offset information associated with the purchase of a selected MOD item 110. The environmental offset may be awarded to a supplier 103, for example, if the supplier 103 sells a part or item as a MOD item 110 as opposed to manufacturing the part or item via conventional manufacturing methods. For example, the environmental offset module 608 may communicate information regarding an environmental offset value of the selected MOD item 110 to the supplier 103 or to an agency administering the environmental offset program in which the supplier 103 participates. The environmental offset value may be based upon the amount of energy conserved or carbon reduced by producing the item as a MOD item 110 as opposed to via conventional methods. In a non-limiting example, a part manufactured in a factory operating on coal power may require ten units worth of energy associated with a carbon footprint to produce. The same part produced as a MOD item may only require three units worth of energy to produce. The environmental offset module 608 in such a situation could assign the supplier 103 a credit of seven environmental offset credits based on the energy savings associated with producing the item as a MOD item rather than via the conventional coal factory approach. In some aspects, the environmental offset applied in operation 710 can be based also in part on the materials used or on the kinds of customization selected by the user 102.

At operation 712, the payment module 610 can coordinate payment associated with a supplier 103. The payment module 610 can coordinate payment between any of the users 102, the service provider 101, and/or the suppliers 103. In some embodiments, the service provider 101 pays the supplier 103 for the use of 3D manufacturing instructions 107 associated with the supplier 103, and the payment module 610 provides this function. In one example, the payment module 610 may communicate sales information and/or a payment to the supplier 103 for every MOD item 110 that is produced and associated with 3D manufacturing instructions 107 received from the supplier 103. In some embodiments, the supplier 103 pays the service provider 101 for the production of MOD items 110 that are based on 3D manufacturing instructions 107 associated with the supplier 103, and the payment module 610 provides this function. In one non-limiting example, the payment module 610 provides a bill to the third party supplier 103 for every 3D manufacturing instructions 107 retrieved by the supplier interface module 602. As a specific example, if a manufacturer (as a supplier 103) utilizes systems herein to provide MOD items 110 to fulfill warranties on parts for the manufacturer's products, the manufacturer may provide the user 102 with a code when the user 102 calls the manufacturer regarding a manufacturer warranty. The user 102 might enter that code as payment for the part to be delivered as a MOD item 110, and the service provider 101 may coordinate payment directly with the manufacturer/supplier 103 instead of with the user 102 based on the code entered by the user 102. In some embodiments, the payment module 610 can coordinate payment from the supplier 103 to the service provider 101 for the service of offering the items of the supplier 103 as MOD items 110. In some embodiments, the payment module 610 can coordinate revenue splitting between various entities. For example, the payment module 610 can coordinate revenue splitting between service providers 101, users 102, suppliers 103, and/or other relevant parties. In a specific example, a payment is received from a user 102 for a phone cover with an embossed sports team logo (i.e., a MOD item 110), and the payment module 610 distributes payment between a vendor of the phone cover (i.e., a first supplier 103, which provided the base file for the MOD item 110), the phone manufacturer (i.e., a first relevant party, which holds rights associated with the phone's design), a broker for sports logos (i.e., a second supplier 103, which provided the customization file for the MOD item 110), the sports team (i.e., a second relevant party, which holds rights associated with the logo), and/or the entity providing the electronic marketplace by which the purchase was completed (i.e., the service provider 101). Revenue splitting can be between any number of vendors, including only one, and the electronic marketplace service provider, or may be split only between vendors.

Figure 8:
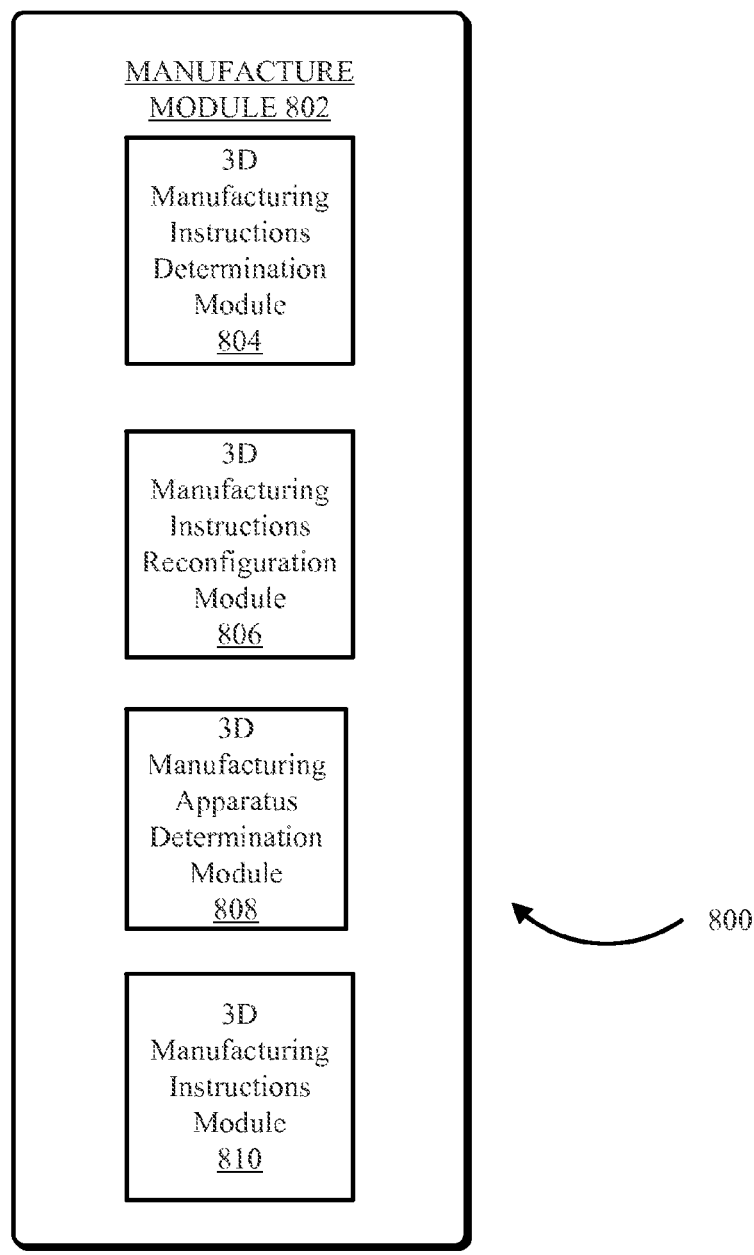
FIG. 8 is a schematic diagram depicting aspects of an example manufacture module in accordance with embodiments.

FIG. 8 depicts aspects of an example manufacture module 802. Manufacture module 802 can include a 3D manufacturing instructions determination module 804, a 3D manufacturing instructions reconfiguration module 806, a 3D manufacturing apparatus determination module 808, and a manufacturing instructions module 810. The 3D manufacturing instructions determination module 804 can be provided for determining which 3D manufacturing instructions 107 are associated with a selected MOD item 110. The 3D manufacturing instructions reconfiguration module 806 can be provided to reconfigure 3D manufacturing instructions 107 associated with the MOD item 110. The 3D manufacturing apparatus determination module 808 can be provided for determining the specific 3D manufacturing apparatus 108 that is to be used for manufacturing the MOD item 110. The manufacturing instructions module 810 can be provided for producing the 3D manufacturing instructions 107 that will be used to cause the 3D manufacturing apparatus 108 to manufacture the MOD item 110.

Figure 9:
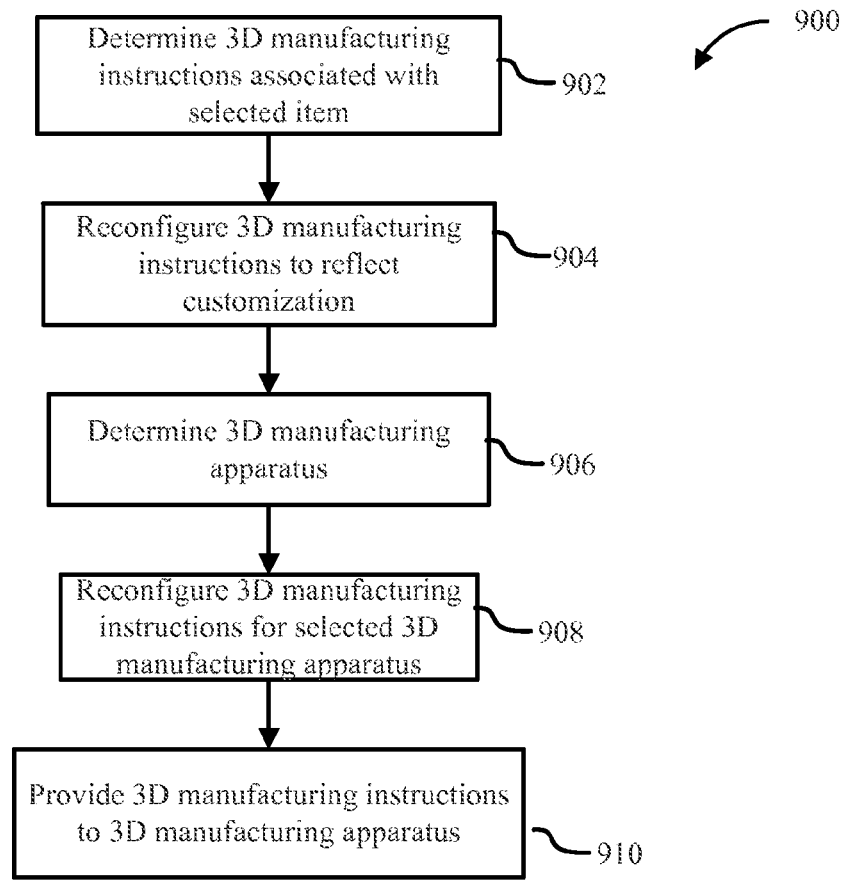
FIG. 9 is a flow chart representing a process that can be executed by the manufacture module in accordance with embodiments.

FIG. 9 is a flow chart representing a process 900 that can be executed by the manufacture module 802. At 902, the 3D manufacturing instructions determination module 804 can determine 3D manufacturing instructions 107 associated with a selected item. The 3D manufacturing instructions 107 can be base files or customization files. The 3D manufacturing instructions 107 can also be provided by the service provider 101 and/or by third party suppliers 103. The 3D manufacturing instructions 107 may be stored on the service provider computer 216 such as in a data store 240, and/or 3D manufacturing instructions 107 associated with a selected item may be retrieved from third party computers 214 via the network 212.

At 904, 3D manufacturing instructions reconfiguration module 806 can reconfigure 3D manufacturing instructions 107 associated with the selected MOD item 110. Reconfiguring may include modifying the 3D manufacturing instructions 107 to reflect customization done by the customization module 408, described above, for a selected MOD item 110.

At 906, the 3D manufacturing apparatus determination module 808 can determine which 3D manufacturing apparatus 108 will be used to manufacture the MOD item 110. The determination may be based at least in part upon the material selected for manufacturing the MOD item 110, the type of machines available for producing a MOD item 110 of that material, and/or the location of the user 102. The determination may also be based on a rating of the various 3D manufacturing apparatuses 108 available and whether the rating is sufficient to manufacture a MOD item 110 of a sufficient caliber or quality to comply with the selection of the MOD item. The determination of the 3D manufacturing apparatus 108 may also be based upon the location of the available 3D manufacturing apparatuses 108. The determination may also be based upon what kind of 3D manufacturing instructions 107 the MOD item 110 has associated with it and whether available 3D manufacturing apparatuses 108 can support that kind of 3D manufacturing instructions 107.

At operation 908, the 3D manufacturing instructions reconfiguration module 806 can reconfigure 3D manufacturing instructions 107 associated with the selected MOD item 110 to for the selected 3D manufacturing apparatus 108. For example, the 3D manufacturing instructions 107 may be reconfigured so as to convert the 3D manufacturing instructions 107 to a type that is supported by the selected 3D manufacturing apparatus 108. Alternatively, the 3D manufacturing instructions 107 might be reconfigured to reflect the resolution or quality of the 3D manufacturing apparatus 108 and to convert the 3D manufacturing instructions 107 to an appropriate caliber for the selected 3D manufacturing apparatus 108.

At operation 910, the manufacturing instructions module 810 can provide 3D manufacturing instructions 107 to the selected 3D manufacturing apparatus 108. The manufacturing instructions 107 can reflect the reconfiguration performed in operation 908. The manufacturing instructions 107 may also be provided to a 3D manufacturing apparatus 108 based on the kind of 3D manufacturing apparatus 108.

Figure 10:
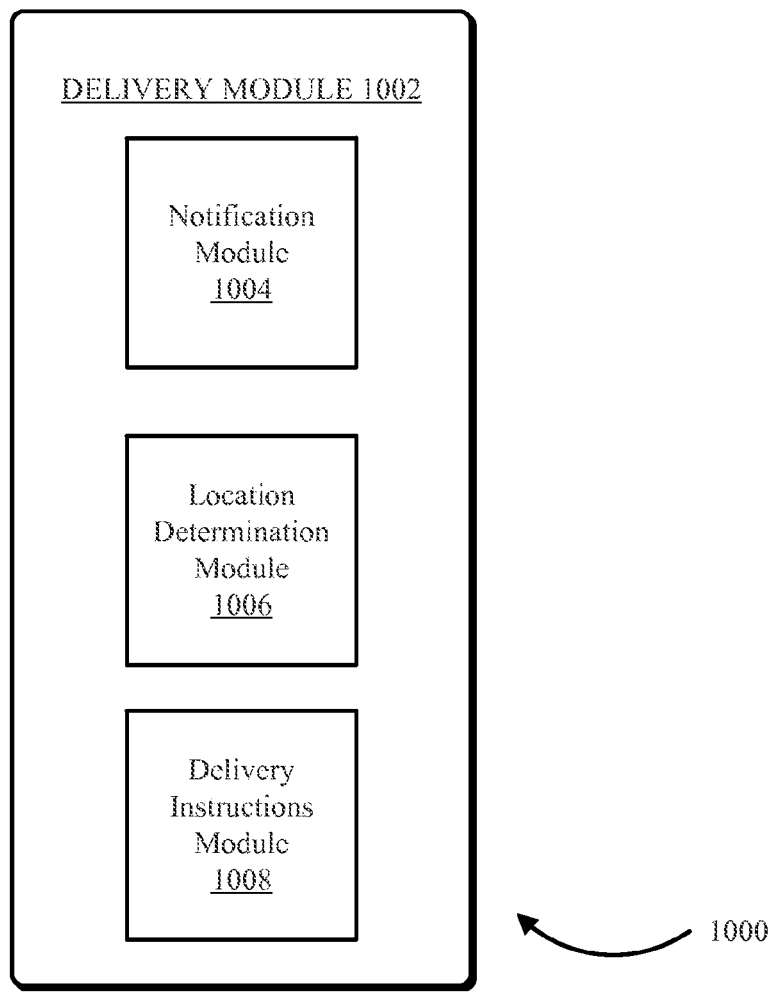
FIG. 10 is a schematic diagram depicting aspects of an example delivery module in accordance with embodiments.

FIG. 10 depicts aspects of an example delivery module 1002. The delivery module 1002 can include a notification module 1004, a location determination module 1006, and a delivery instructions module 1008. The notification module 1004 can be provided for notifying a user 102 regarding the status of the manufacture or delivery of a MOD item 110. The location determination module 1006 can be provided for determining a location of manufacture and/or delivery of the MOD item 110. The delivery instructions module 1008 can be provided for generating and communicating instructions regarding delivery of the MOD item 110 to the user 102.

Figure 11:
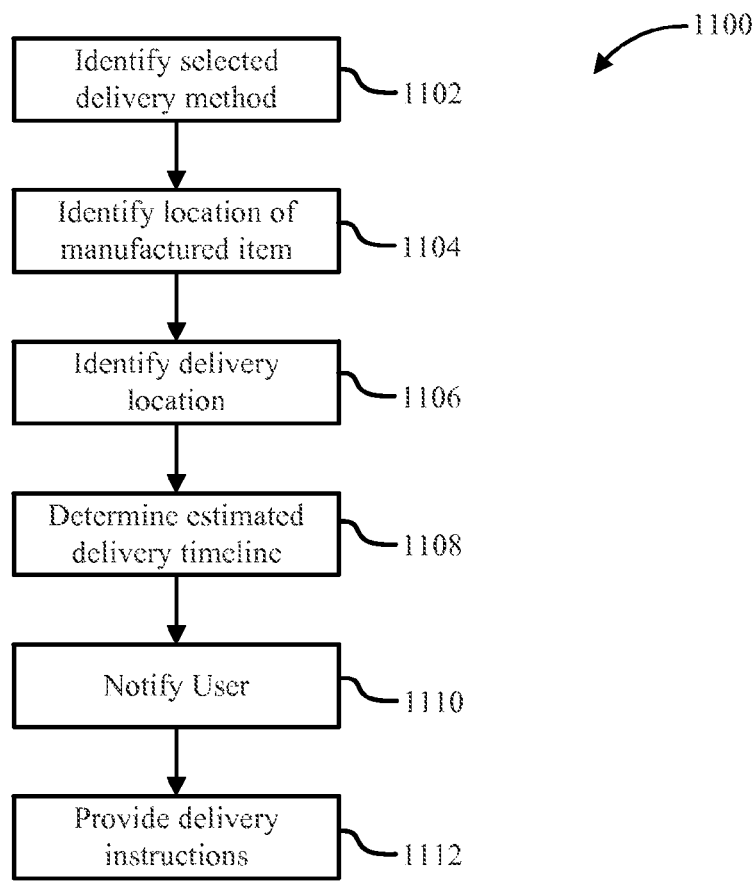
FIG. 11 is a flow chart representing a process that can be executed by the delivery module in accordance with embodiments.

FIG. 11 is a flow chart representing a process 1100 that can be executed by the delivery module 1002. At 1102, the delivery module 1002 can identify the selected delivery method for the MOD item 110. In some aspects, the selected delivery method may be determined by the delivery module 1002 based on parameters associated with one or more delivery methods. Non-limiting examples of parameters that may be evaluated in determining a delivery method include user location information (such as geo-positioning information from a user device, a location stored in a profile of the user, an address inputted by the user, or a place within a defined distance from a location associated with other user location information), time of delivery, cost to make, shipping or other delivery cost, storage cost, location of existing parts, location of 3D manufacturing apparatus 108, availability of 3D manufacturing apparatus 108, longevity or expected useful life of an item, preferences of a supplier 103, preferences of a service provider 101, preferences of a user 102, and preferences of another relevant party (e.g., a rights-holder that is not a service provider 101, a user 102, or a supplier 103). In some aspects, the selected delivery method may be based upon delivery preferences received from the user 102 at operation 514 discussed above in FIG. 5. In one example, a user 102 indicates a preference for a delivery method utilizing a manufacturing apparatus 108 within 10 miles of a home address of the user 102, and the delivery method is determined based at least in part upon the delivery methods associated with the manufacturing apparatuses 108 within that zone.

In some instances, the delivery preference options presented to the user 102 by the delivery preferences module 410 for the delivery preferences module 410 to receive at 514 may be determined based on one or more of these parameters. In a non-limiting example, the delivery module 1002 may determine that an order 104 can be fulfilled by any of three delivery methods. In this example, the first delivery method involves producing and shipping a MOD item 110 from an available 3D manufacturing apparatus 108 in a warehouse, the second delivery method involves producing the MOD item 110 via an available 3D manufacturing apparatus 108 at a pick-up location, and the third delivery method involves producing the MOD item 110 on an available 3D manufacturing apparatus 108 located on a truck that can add the delivery to its present route. The delivery module 1002 may instruct the delivery preferences module 410 to only present the third delivery option to the user 102, based on a determination that the cost of fulfilling the order 104 via the first delivery method would exceed a cost threshold previously established by the supplier 103 and the pick-up location would not meet location criteria previously established by the user 102.

At operation 1104, the location determination module 1006 can identify the location of the MOD item 110. The location of the MOD item may be a real time determination. The location of the MOD item 110 may also be a prospective determination. For example, the location determination module 1006 may determine where the MOD item 110 is anticipated to be at a given time based on the 3D manufacturing apparatus 108 selected in operation 906 and the delivery method identified in operation 1102.

At 1106, the location determination module 1006 can determine the delivery location for the MOD item 110. The delivery location may be determined by the user-selected delivery preferences. The delivery location may also be determined by the delivery module 1002 based on parameters as stated above. The delivery module 1002 may determine the default delivery location based on the quality of the 3D manufacturing apparatus 108 to be used to manufacture MOD item 110 or the proximity of the 3D manufacturing apparatus 108.

At operation 1108, the delivery module 1002 may determine an estimated delivery timeline of a MOD item 110 to the user 102. For example, the delivery module 1002 can determine an estimated length of time remaining before the user 102 can retrieve the MOD item 110 from a pickup location. As another example, the delivery module 1002 can determine an estimated time that the MOD item will be delivered to a location designated by the location determination module 1006 at operation 1106. In some aspects, the delivery module 1002 at 1108 determines an estimated delivery timeline of the MOD item 110 based on the 3D manufacturing apparatus 108 selected in operation 906, the delivery method identified in operation 1102, and/or the delivery location identified in operation 1106.

At operation 1110, the notification module 1004 can notify the user 102 about the status of the MOD item 110. For example, the notification module 1004 may notify the user 102 that the MOD item 110 is ready to be picked up. The notification module 1004 may alternatively notify the user 102 that the MOD item 110 is estimated to arrive to the delivery address at a certain time, i.e., providing an estimated time for pickup or delivery. The notification module 1004 may also provide the user 102 with an access code for accessing or verifying that the user 102 is the intended recipient of the MOD item 110. In some aspects, the notification is based on preferences identified by the user 202. For example, the notification may be provided by one or more of email, text, or push notifications.

At operation 1112, the delivery instructions module 1008 may provide delivery instructions regarding the MOD item 110. For example, the delivery instructions module 1008 may provide instructions regarding where the MOD item 110 is to be delivered or stored for receipt by the user 102. The details of the delivery instructions provided by the delivery instructions module 1008 may depend upon the delivery method utilized.

Delivery Methods

Various delivery methods may be utilized with systems discussed herein. The delivery method selected for providing a MOD item 110 to a user 102 may affect the functions performed by various modules discussed above. The following discussion of examples of delivery methods may illustrate ways that a selected delivery method may affect the functions performed by previously discussed modules.

Figure 12:
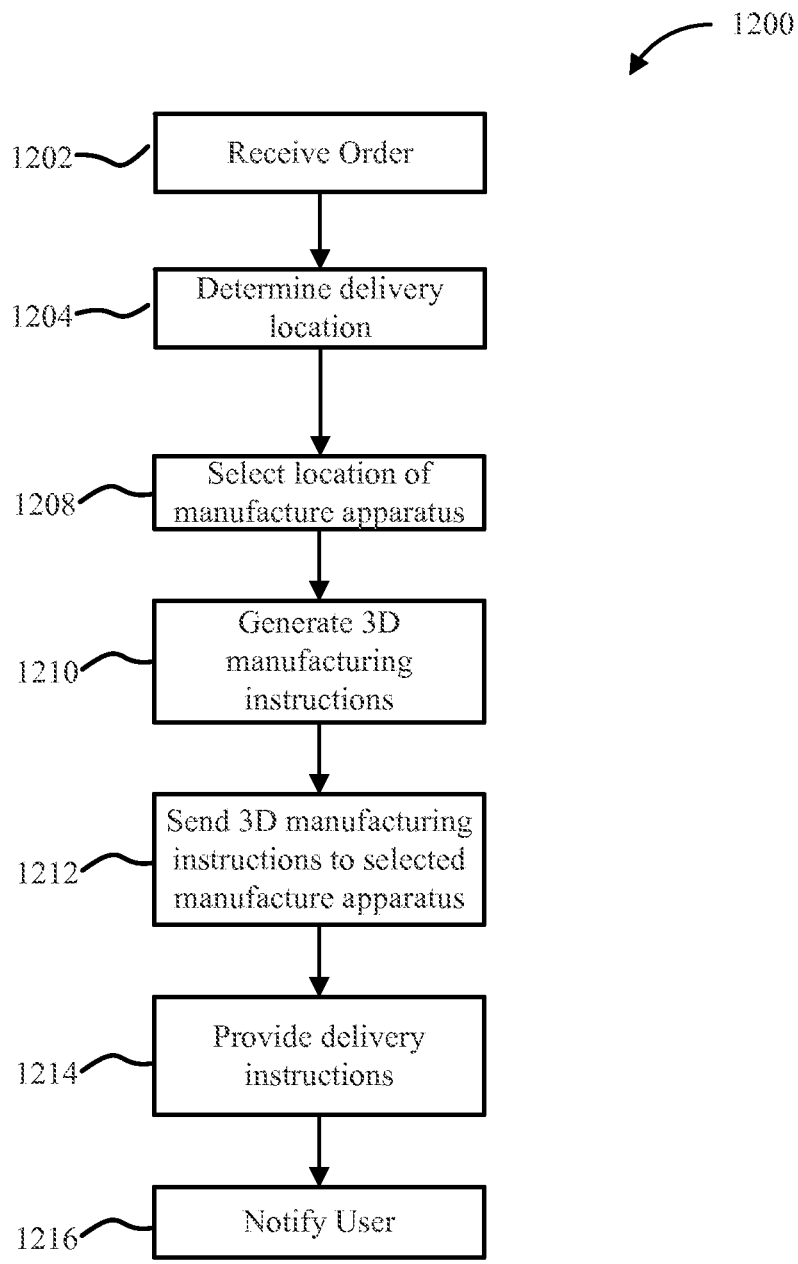
FIG. 12 is a flow chart representing a process that can be executed by a system to perform a first example delivery method in accordance with embodiments.

In a first example of a delivery method for providing a MOD item 110 to a user 102, the MOD item 110 can be produced by a 3D manufacturing apparatus 108 located in a warehouse or a fulfillment center. For example, a user 102 may request a MOD item 110 be delivered directly to his or her house. The location determination module 1006 selects an appropriate fulfillment center, for example, based on the proximity to the user 102. The 3D manufacturing apparatus determination module 808 selects a 3D manufacturing apparatus 108 for printing the MOD item 110 based on the availability of 3D manufacturing apparatuses 108 located at the selected fulfillment center. The manufacturing instructions module 810 sends 3D manufacturing instructions 107 to the selected 3D manufacturing apparatus 108 and the MOD item 110 is fabricated. The delivery instructions module 1008 provides a delivery address, and a local shipping agency, such as the United Parcel Service (UPS), can then pick up the MOD item 110 and delivery it to the user 102. FIG. 12 is a flow chart representing a process 1200 that can be executed by a system 200 to perform a first example delivery method.

At 1202, the order module 402 can receive an order 104 for a MOD item 110 from a user 102. Delivery via a warehouse can be selected as the delivery method. As may be the case regarding any of the examples of delivery methods discussed in this section, the selection of the delivery method may be based upon a selection by the user 102 received by the delivery preferences module 410 or may be a determination made by a module (such as the order module 402 or delivery module 1002) utilizing an algorithm for determining a default delivery method.

At 1204, the location determination module 1006 can determine the location to which the MOD item 110 is to be delivered. As may be the case regarding any of the examples of delivery methods discussed in this section, the location determination module 1006 may prompt the user 102 for a delivery location via the browser application 206 or the location determination module 1006 may utilize a default delivery location associated with an account or profile of the user 102.

At 1208, a location of the 3D manufacturing apparatus 108 can be selected. For example, the location determination module 1006 may utilize the delivery location for the MOD item 110 in selecting a warehouse having at least one 3D manufacturing apparatus 108 available to manufacture the MOD item 110. The 3D manufacturing apparatus determination module 808 can select a particular 3D manufacturing apparatus 108 at the warehouse for producing the MOD item 110.

At 1210, the manufacturing instructions module 810 can generate manufacturing instructions 107 for producing the MOD item 110 via the selected 3D manufacturing apparatus 108 in the warehouse. At 1212, the manufacturing instructions module 810 can send the manufacturing instructions 107 to produce the MOD item 110 to the selected 3D manufacturing apparatus 108 in the warehouse.

At 1214, the delivery instructions module 1008 can provide delivery instructions for transporting the MOD item 110 from the warehouse of manufacture to the delivery location. For example, the delivery instructions module 1008 may provide a delivery address and appropriate instructions for transporting the MOD item 110 to the address via a delivery vehicle or courier service.

At 1216, the notification module 1004 may notify the user 102 of the status of the MOD item 110, such as the progress in manufacturing the MOD item 110 in the warehouse, the location of the MOD item 110, the time remaining before the arrival of the MOD item 110 to the delivery location, or confirmation of delivery of the MOD item 110.

In a second example of a delivery method for providing a MOD item 110 to a user 102, the MOD item 110 can be produced by a mobile 3D manufacturing apparatus 108. By "mobile", we mean that the position of the 3D manufacturing apparatus 108 changes because it is mounted within or contained within a moving vehicle or other structure. A vehicle for a mobile manufacturing apparatus 108 can include a computer communications link such that information can be exchanged between the service provider computers 216 and the vehicle and/or the 3D manufacturing apparatus 108. For example, the computer communications link can facilitate the sending and/or receiving of delivery route instructions or status, 3D manufacturing instructions 107, and/or availability or other status information for the 3D manufacturing apparatus 108. A vehicle having a mobile manufacturing apparatus 108 may be specially designated solely for the delivery of MOD items 110 or the vehicle may also be designated for additional purposes. For example, a vehicle utilized for delivery of non-MOD items (such as groceries) may also include a mobile 3D manufacturing apparatus 108 for the production and delivery of MOD items 110 en route to deliver the non-MOD items. By using a mobile 3D manufacturing apparatus 108, a MOD item 110 can be delivered during routine runs, or a drop may be arranged using a trip planning algorithm.

Figure 13:
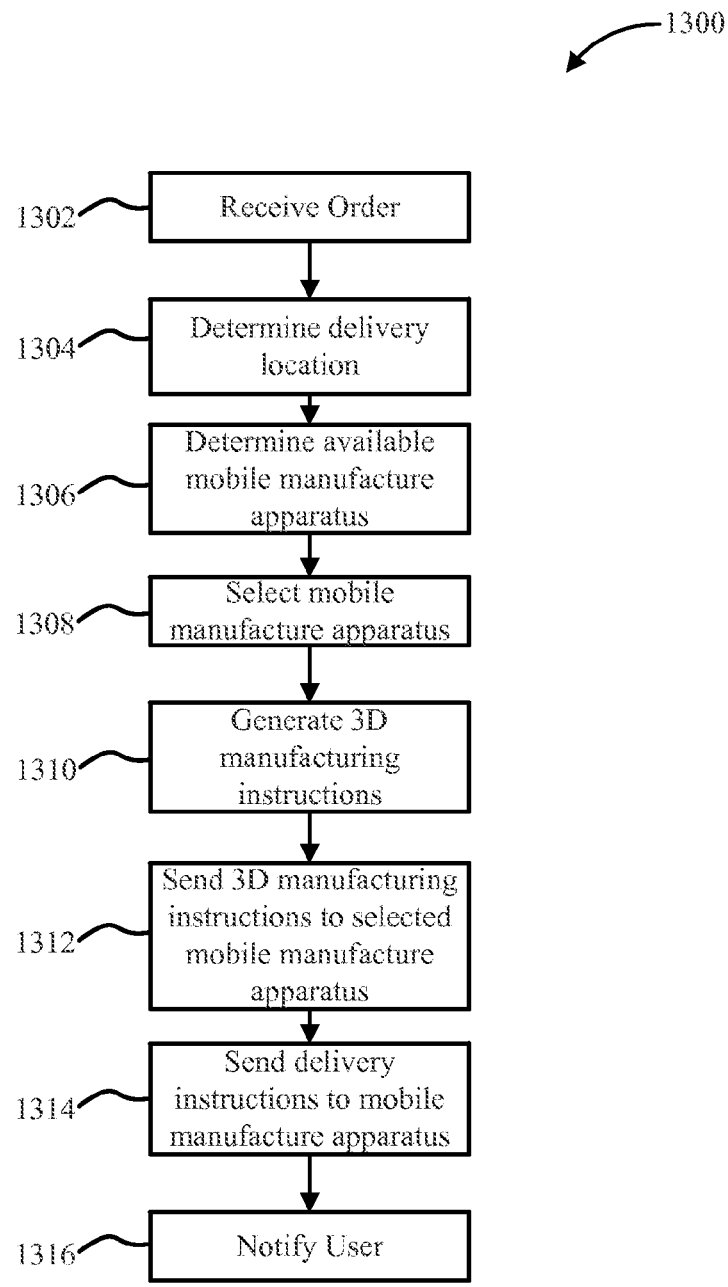
FIG. 13 is a flow chart representing a process that can be executed by a system to perform a second example delivery method in accordance with embodiments.

FIG. 13 is a flow chart representing a process 1300 that can be executed by a system 200 to perform a second example delivery method. At 1302, the order module 402 can receive an order 104 for a MOD item 110 from a user 102. Delivery via a mobile 3D manufacturing apparatus 108 can be selected by the user 102 as the delivery method, or can be selected due to convenience by the service provider 101. At 1304, the location determination module 1006 can determine the location to which the MOD item 110 is to be delivered, which may have been given with the order 104.

At 1306, the 3D manufacturing apparatus determination module 808 can identify an available mobile 3D manufacturing apparatus 108. The 3D manufacturing apparatus determination module 808 may utilize the delivery location for the MOD item 110 in identifying an available mobile 3D manufacturing apparatus 108. For example, the 3D manufacturing apparatus determination module 808 may identify mobile 3D manufacturing apparatuses 108 that are nearby the delivery location or that will be nearby within a certain window of time. The window of time may be based on an estimated amount of time for the mobile 3D manufacturing apparatus 108 to produce the MOD item 110. The estimated amount of time for the mobile 3D manufacturing apparatus 108 to produce the MOD item 110 may be based in part on whether the mobile 3D manufacturing apparatus 108 is in use or immediately available to begin manufacturing the MOD item 110.

At 1308, the 3D manufacturing apparatus determination module 808 can select a particular available mobile 3D manufacturing apparatus 108 for producing the MOD item 110. The selection may be based at least in part upon the estimated amount of time for the mobile 3D manufacturing apparatus 108 to produce the MOD item 110, the distance of the mobile manufacturing unit from the delivery location, the amount of deviation in time or distance from a route of the mobile manufacturing unit to reach the delivery location, other considerations, or any combination thereof.

At 1310, the manufacturing instructions module 810 can generate manufacturing instructions 107 for producing the MOD item 110 via the selected mobile 3D manufacturing apparatus 108. At 1312, the manufacturing instructions module 810 can send the manufacturing instructions 107 to produce the MOD item 110 to the selected mobile 3D manufacturing apparatus 108.

At 1314, the delivery instructions module 1008 can provide delivery instructions for delivering the MOD item 110 to the delivery location. For example, the delivery instructions module 1008 may provide a delivery address and appropriate instructions for transporting the MOD item 110 to the address.

At 1316, the notification module 1004 may notify the user 102 of the status of the MOD item 110, such as the progress in manufacturing the MOD item 110 via the selected mobile 3D manufacturing apparatus 108, the location of the mobile 3D manufacturing apparatus 108 and/or the MOD item 110, the time remaining before the arrival of the MOD item 110 to the delivery location, or confirmation of delivery of the MOD item 110.

In an illustrative example of the execution of the process 1300, an order 104 is received at 1302 from a user 102 requesting a MOD item 110 delivered via a mobile 3D manufacturing apparatus 108. At 1304, the delivery location is determined to be an address, 742 Evergreen Terrace. At 1306, the 3D manufacturing apparatus determination module 808 identifies three available mobile 3D manufacturing apparatuses 108 that could produce and deliver the selected MOD item 110 within the next hour. A first available mobile manufacturing apparatus 108 can be a grocery delivery truck outfitted with a 3D manufacturing apparatus 108 not presently engaged in producing a MOD item 110. The first available mobile 3D manufacturing apparatus 108 is capable of producing the ordered MOD item 110 in 12 minutes. The grocery delivery truck is located 5 miles away from 742 Evergreen Terrace and scheduled to deliver groceries to 744 Evergreen Terrace (the house next door to 742 Evergreen Terrace) during its present route in 32 minutes. The second available mobile 3D manufacturing apparatus 108 can be a warehouse item delivery van outfitted with a 3D manufacturing apparatus 108 not presently engaged in producing a MOD item 110. The second available mobile 3D manufacturing apparatus 108 is also capable of producing the selected MOD item 110 in 12 minutes. The warehouse item delivery van is located 3 miles away and could deliver the MOD item 110 in 19 minutes to 742 Evergreen Terrace with a 2.5 mile deviation from its present route. The third available mobile 3D manufacturing apparatus 108 can be the third of three 3D manufacturing apparatuses 108 located on a vehicle designated solely for mobile manufacturing. All three 3D manufacturing apparatuses 108 on the mobile manufacturing vehicle are occupied producing other MOD items 110, although the third available mobile 3D manufacturing apparatus 108 is estimated to finish and be available for manufacturing the selected MOD item 110 in 2 minutes. The third available 3D manufacturing apparatus 108—a newer model than the first and second available 3D manufacturing apparatuses 108—is capable of producing the selected MOD item 110 in 8 minutes such that the selected MOD item 110 could be produced in a total of 10 minutes including the 2 minute wait until availability. The mobile manufacturing vehicle is located 2 miles away and could deliver the MOD item 110 in 24 minutes to 742 Evergreen Terrace with a 1.5 mile deviation from its present route. At 1308, the 3D manufacturing apparatus determination module 808 selects the first available mobile manufacturing located on the grocery truck, in this case, based on the minimal deviation from the present route of the grocery truck. At 1310, the manufacturing instructions module 810 generates manufacturing instructions 107 for producing the MOD item 110 specific to the model of the mobile 3D manufacturing apparatus 108 located on the grocery truck. At 1312, the manufacturing instructions module 810 sends the manufacturing instructions 107 to the mobile 3D manufacturing apparatus 108 located on the grocery truck. At 1314, the delivery instructions module 1008 provides delivery instructions that direct the driver of the grocery truck to deliver the MOD item 110 to 742 Evergreen Terrace prior to delivering the groceries to 744 Evergreen Terrace during the delivery route. Thus, the decision for a particular mobile 3D manufacturing apparatus 108 can be based upon a number of factors and could be resolved in accordance with an algorithm or another software decision process.

In a third example of a delivery method for providing a MOD item 110 to a user 102, the MOD item 110 can be produced by a 3D manufacturing apparatus 108 associated with a pick-up location. For example, the 3D manufacturing apparatus 108 may be associated with a locker designated as the pick-up location for a user 102 to pick-up an ordered MOD item 110. In some aspects, the 3D manufacturing apparatus 108 is located within a single locker and produces a MOD item 110 in the locker. In other aspects, the 3D manufacturing apparatus 108 is located near a cluster of lockers, and when a MOD item 110 is produced by the 3D manufacturing apparatus 108, the MOD item is automatically transferred the short distance from the 3D manufacturing apparatus 108 into a locker designated as the pick-up location of the MOD item 110 by the user 102.

Figure 14:
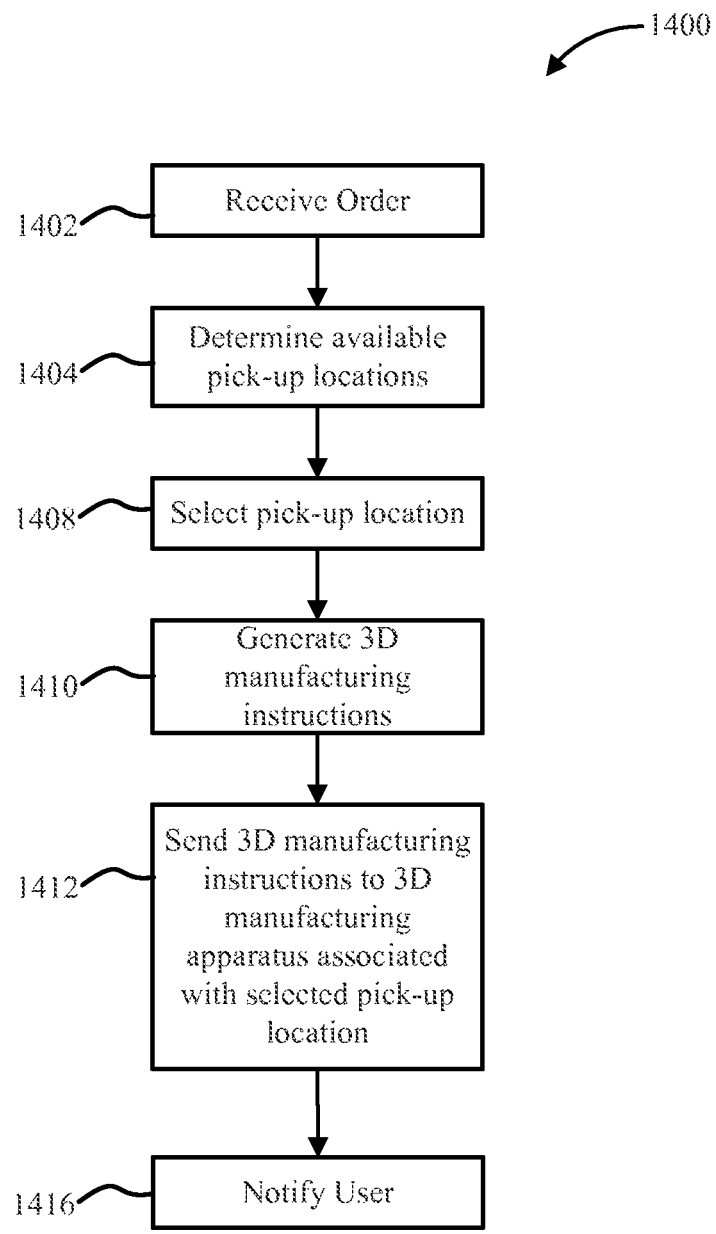
FIG. 14 is a flow chart representing a process that can be executed by a system to perform a third example delivery method in accordance with embodiments.

FIG. 14 is a flow chart representing a process 1400 that can be executed by a system 200 to perform a third example delivery method. At 1402, the order module 402 can receive an order 104 for a MOD item 110 from a user 102. Delivery via a 3D manufacturing apparatus 108 associated with a pick-up location can be selected as the delivery method. At 1404, the location determination module 1006 can determine available pick-up locations. For example, the location determination module 1006 can identify pick-up locations that include lockers that are not occupied with MOD items 110 awaiting pick-up. At 1408, the location determination module 1006 can select an available pick-up location. The selection may be based at least in part upon the estimated amount of time for the 3D manufacturing apparatus 108 to produce the MOD item 110, the distance between the 3D manufacturing apparatus 108 and a location associated with the user 102, other considerations, or any combination thereof.

At 1410, the manufacturing instructions module 810 can generate manufacturing instructions 107 for producing the MOD item 110 via a 3D manufacturing apparatus 108 associated with the selected pick-up location. At 1412, the manufacturing instructions module 810 can send the manufacturing instructions 107 to produce the MOD item 110 to the selected 3D manufacturing apparatus 108 associated with the selected pick-up location. The manufacturing instructions 107 may include instructions for transferring the MOD item from the selected 3D manufacturing apparatus 108 associated with the selected pick-up location to the selected pick-up location.

At 1416, the notification module 1004 may notify the user 102 of the status of the MOD item 110, such as the progress in manufacturing the MOD item 110 at the selected pick-up location, the location of the selected pick-up location, access information for retrieving the MOD item 112 from the selected pick-up location, the time remaining until the MOD item 110 can be accessed at the selected pick-up location, or confirmation of availability of the MOD item 110 at the pickup location.

In a fourth example of a delivery method for providing a MOD item 110 to a user 102, the MOD item 110 can be produced by a 3D manufacturing apparatus 108 associated with an order and storage location. For example, the 3D manufacturing apparatus 108 may be associated with a kiosk provided for receiving an order 104 from a user 102 for a MOD item 110 and storing the MOD item 110 for subsequent retrieval by the user 102. In some aspects, the 3D manufacturing apparatus 108 can be located within a single storage unit and produces a MOD item 110 in the single storage unit. In other aspects, the 3D manufacturing apparatus 108 can be located near a cluster of storage units, and when a MOD item 110 is produced by the 3D manufacturing apparatus 108, the MOD item can be automatically transferred the short distance from the 3D manufacturing apparatus 108 into an individual storage unit designated for the MOD item 110 until retrieval by the user 102.

Figure 15:
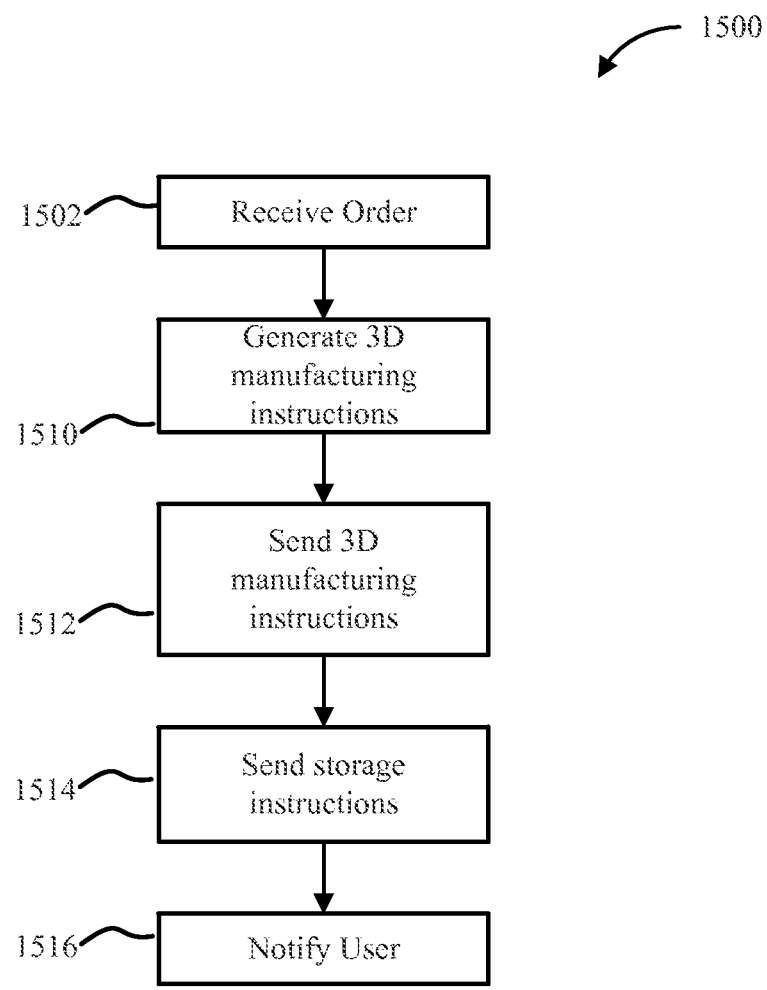
FIG. 15 is a flow chart representing a process that can be executed by a system to perform a fourth example delivery method in accordance with embodiments.

FIG. 15 is a flow chart representing a process 1500 that can be executed by a system 200 to perform a fourth example delivery method. At 1502, the order module 402 can receive an order 104 for a MOD item 110 from a user 102. The order 104 may be received from an order unit associated with one or more 3D manufacturing apparatuses 108 and one or more storage units. Delivery via a storage unit associated with an order unit can be selected as the delivery method.

At 1510, the manufacturing instructions module 810 can generate manufacturing instructions 107 for producing the MOD item 110 via a 3D manufacturing apparatus 108 associated with the order unit. At 1512, the manufacturing instructions module 810 can send the manufacturing instructions 107. At 1514, the delivery module 1002 can send storage instructions. In some aspects, such as when only one 3D manufacturing apparatus 108 is associated with the order unit, the manufacturing instructions 107 can be sent directly to the 3D manufacturing apparatus 108. In some aspects, such as when multiple storage units are associated with a single 3D manufacturing apparatus 108, the storage instructions may include a selection of a storage unit and instructions for moving the MOD item 110 from the 3D manufacturing apparatus 108 to the selected storage unit. In some aspects, such as when multiple storage units are associated with an order unit and each storage unit includes a 3D manufacturing apparatus 108, the storage instructions may include a selection of a storage unit and the manufacturing instructions 107 can be sent to the 3D manufacturing apparatus 108 associated with the selected storage unit.

At 1516, the notification module 1004 may notify the user 102 of the status of the MOD item 110, such as the progress in manufacturing the MOD item 110 at the order location, identification of the selected storage unit storing the MOD item 110, access information for retrieving the MOD item 112 from the selected storage unit, the time remaining until the MOD item 110 can be accessed at the selected storage unit, or confirmation of availability of the MOD item 110 at the storage unit.

In a fifth example of a delivery method for providing a MOD item 110 to a user 102, the MOD item 110 can be produced by a 3D manufacturing apparatus 108 of a user 102. For example, the 3D manufacturing apparatus 108 may be a 3D manufacturing apparatus 108 owned by a user 102, such as a 3-D printer in the user's home. As another example, the 3D manufacturing apparatus 108 may be a 3D manufacturing apparatus 108 controlled by a user 102, such as a rapid prototyping machine at the user's place of work or at a service center renting the use of the machine to the user 102.

Figure 16:
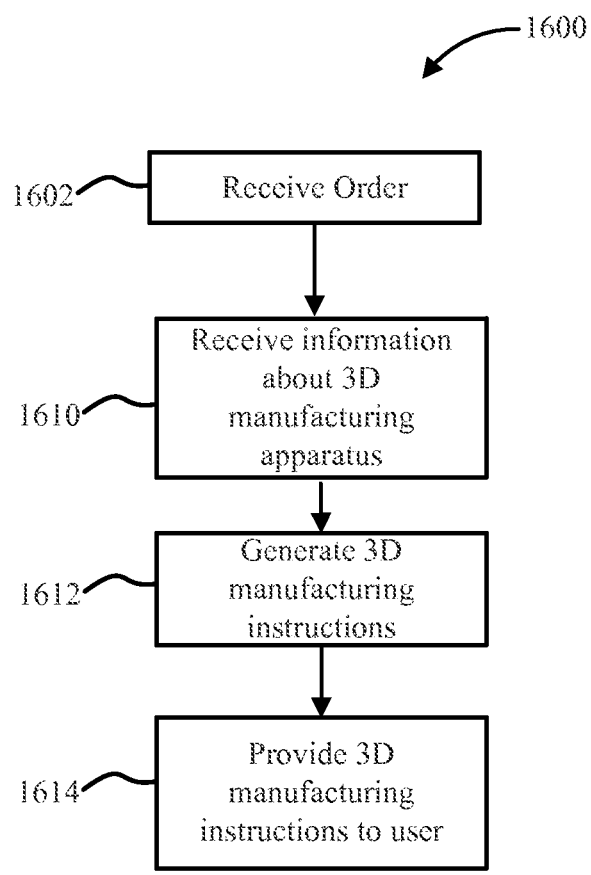
FIG. 16 is a flow chart representing a process that can be executed by a system to perform a fifth example delivery method in accordance with embodiments.

FIG. 16 is a flow chart representing a process 1600 that can be executed by a system 200 to perform a fifth example delivery method. At 1602, the order module 402 can receive an order 104 for a MOD item 110 from a user 102. The order 104 may be received by an electronic marketplace provided by the order module 402. Delivery via a 3D manufacturing apparatus 108 of the user 102 can be selected as the delivery method. At 1608, the order module 402 can receive information about the 3D manufacturing apparatus 108 of the user 102. For example, the information about the 3D manufacturing apparatus 108 of the user 102 may include the make or model of the apparatus, format(s) of manufacturing instructions 107 usable by the 3D manufacturing apparatus 108, manufacturing materials utilized by the 3D manufacturing apparatus 108, size of the 3D manufacturing apparatus 108, and other considerations. At 1610, the manufacturing instructions module 810 can generate manufacturing instructions 107 for producing the MOD item 110 via the 3D manufacturing apparatus 108 of the user 102. The instructions may be based on information received about the 3D manufacturing apparatus 108 of the user 102 at 1608. At 1612, the manufacturing instructions module 810 can provide to the customer manufacturing instructions 107 for producing the MOD item 110 via the 3D manufacturing apparatus 108 of the user 102. In some aspects, the manufacturing instructions 107 can be provided to the customer by sending the manufacturing instructions 107 directly to the 3D manufacturing apparatus 108 of the user 102. In some aspects, the manufacturing instructions 107 are provided to the customer, and further actions of the customer can cause the manufacturing instructions 107 to be sent to the 3D manufacturing apparatus 108 of the user 102. For example, a digital file including 3D manufacturing instructions 107 can be provided to the user 102 such that the user 102 can access the 3D manufacturing instructions 107 later to produce the MOD item 110 on a 3D manufacturing apparatus 108 of the user 102, such as in the user's home or at a service center renting the use of the 3D manufacturing apparatus 108 to the user 102. The manufacturing instructions 107 provided at 1612 may be configured such that the manufacturing instructions 107 can be transferred from the user 102 to a provider of a manufacturing apparatus 108 designated by the user 102.

Supplier Features

Systems discussed herein may provide various methods for interfacing with suppliers 103. The methods utilized for interfacing with suppliers 103 may affect the functions performed by various modules discussed above. The following discussion of examples of methods for interfacing with suppliers 103 may illustrate ways that such methods may affect the functions performed by previously discussed modules.

Figure 17:
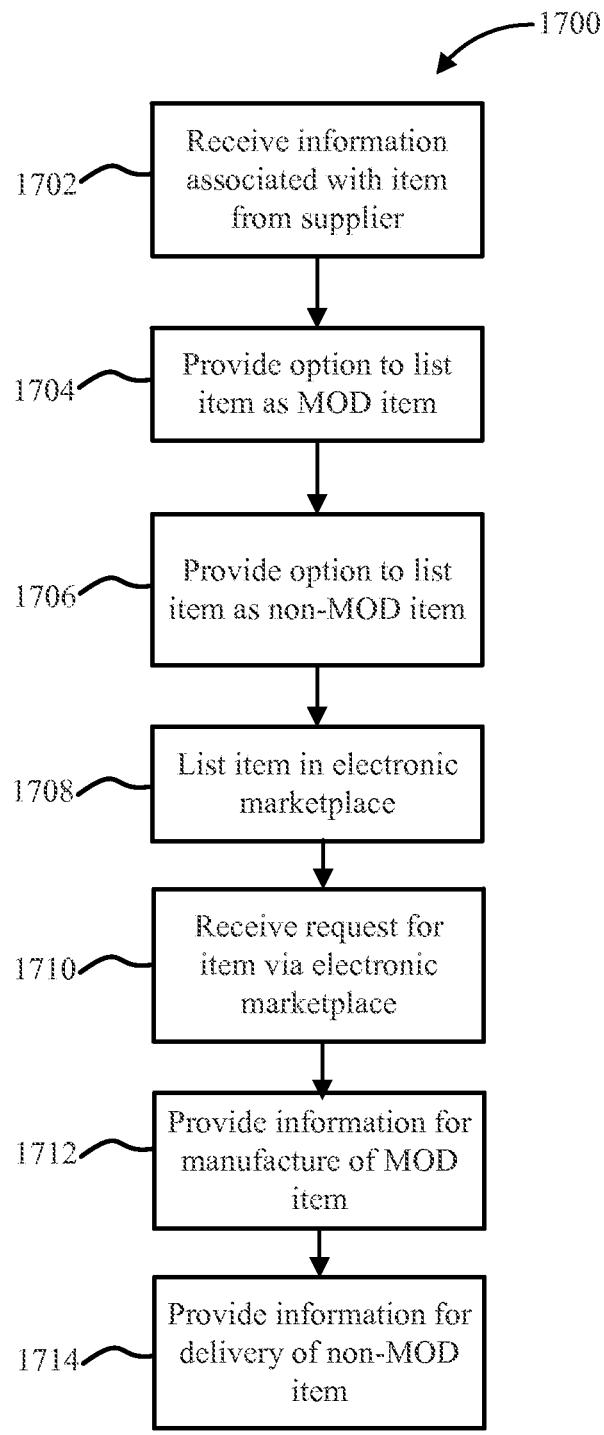
FIG. 17 is a flow chart representing a process that can be executed by a system for distributing MOD items on behalf of suppliers in accordance with embodiments.

Methods can be provided for suppliers 103 or vendors of items to utilize systems of a service provider 101 for distribution of MOD items 110. FIG. 17 is a flow chart representing a process 1700 that can be executed by a system 200 for distributing MOD items 110 on behalf of suppliers 103. At 1702, the supplier interface module 602 can receive information associated with one or more items from a supplier 103. The information associated with the item(s) can include information for obtaining the item(s) as a non-MOD item, such as the location of the item(s) or information for accessing the item(s). The information associated with the item(s) can also include information for manufacturing one or more of the item(s) as a MOD item 110, such as specifications of the item(s) or manufacturing instructions 107 for the item(s). At 1704, the supplier interface module 602 can provide a supplier 103 an option for listing a MOD item in an electronic marketplace. At 1706, the supplier interface module 602 can provide a supplier 103 an option for listing a non-MOD item in the electronic marketplace. The items listed in the electronic marketplace can be made available for consumption via the electronic marketplace. With these options, a supplier 103 may choose to list an item in the marketplace as a non-MOD item, to list an item in the marketplace as a MOD item 110, or to list an item in the marketplace as available either as a non-MOD item or as a MOD item 110. Listing an item in the marketplace as available as a MOD item 110 can reduce the physical space a supplier 103 maintains for storing items as non-MOD items. At 1708, the order module 402 can list the item in an electronic marketplace accessible by a user 102. The order module 402 may list the item in the marketplace designating the item as a MOD item, designating it as a non-MOD item, designating it as either a MOD item or a non-MOD item, or without designating it as a MOD item or non-MOD item. At 1710, the order module 402 can receive a request for an item listed in the marketplace. At 1712, the manufacture module 802 can provide information for manufacturing the item as a MOD item. At 1714, the delivery module 1002 can provide information for delivery of the item as a non-MOD item. In embodiments, an order 104 may involve providing both a MOD item 110 and a non-MOD item. In some embodiments, the non-MOD item may be an assembly that includes a subcomponent produced as a MOD item 110. For example, an order 104 may involve a bag having a number of buckles or clasps. One or more of the buckles or clasps may be printed via a 3D manufacturing apparatus 108 (i.e., subcomponents produced as MOD items 110) and included with or installed on the bag (i.e., non-MOD item assembly) that is shipped to the user 102.

Figure 18:
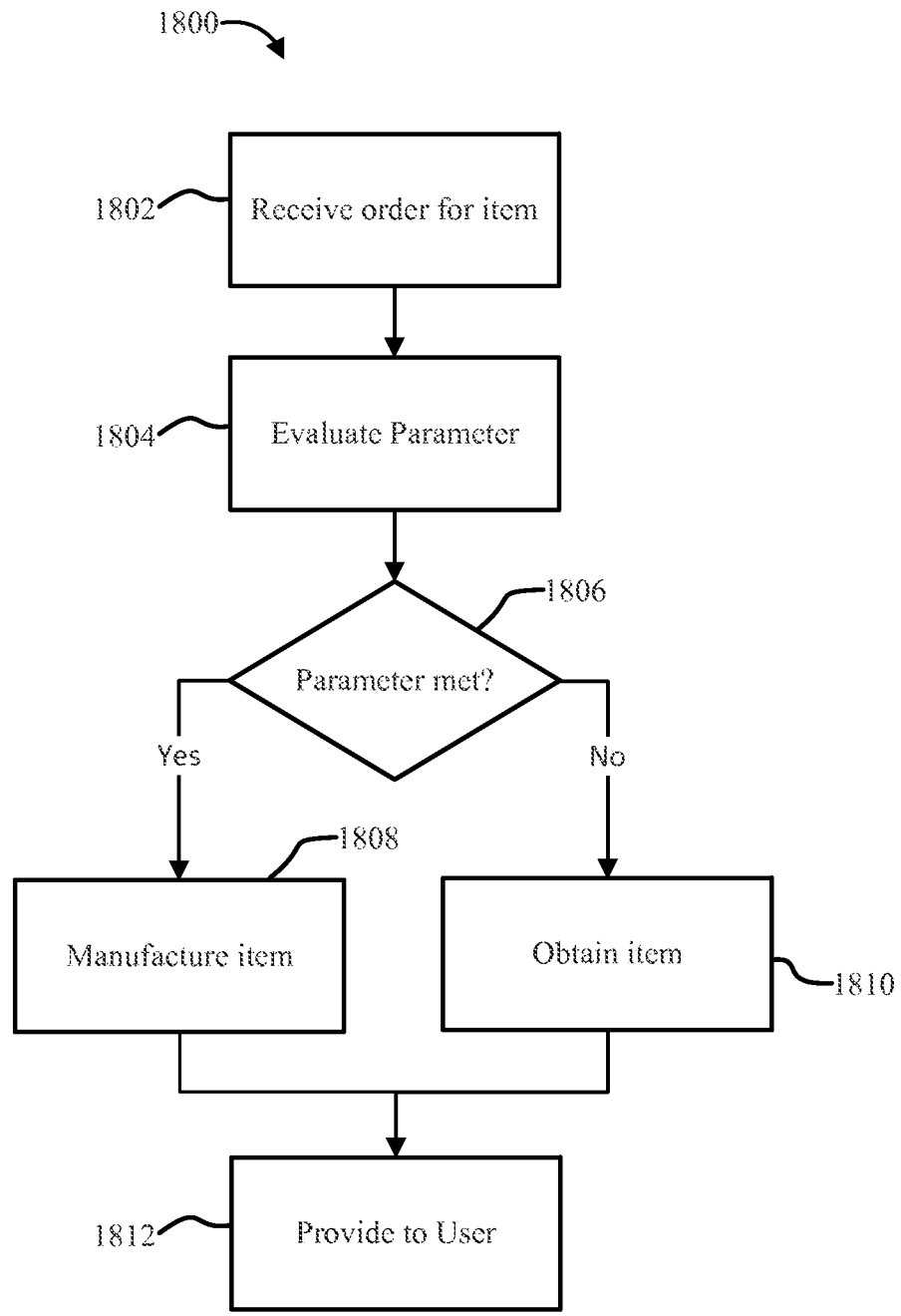
FIG. 18 is a flow chart representing a process that can be executed by a system for determining the manner in which an item is provided to a user in accordance with embodiments.

Methods can be provided for determining the manner in which an item is provided to a user 102. For example, a method may be provided for determining whether an item will be provided to a user 102 as a MOD item or as a non-MOD item. In various aspects, a supplier 103 or vendor of an item may select parameters for determining the manner in which the item will be provided to a user 102. In some aspects, the manner in which an item is to be provided to a user 102 may be determined utilizing parameters without supplier 103 involvement. FIG. 18 is a flow chart representing a process 1800 that can be executed by a system 200 for determining the manner in which an item is provided to a user 102. At 1802, the delivery module 1002 or the supplier interface module 602 can receive an order 104 for an item from a user 102 in an electronic marketplace. The item can be associated with 3D manufacturing instructions 107 such that the item can be produced as a MOD item 110. At 1804, the order module 402 can evaluate one or more parameters associated with various manners of fulfilling the order 104. Non-limiting examples of parameters that may be evaluated in determining a delivery method include time of delivery, cost to make, shipping or other delivery cost, location of existing parts, location of 3D manufacturing apparatus 108, availability of 3D manufacturing apparatus 108, longevity or expected useful life of an item, supplier 103 preferences, service provider 101 preferences, and user preferences. At 1806, the delivery module 1002 can determine whether one or more of the parameters are met. If the parameter(s) are met (Yes at 1806), then at 1808, the manufacture module 802 can provide instructions for manufacturing the item as a MOD item 110. At 1812, the delivery module 1002 can provide instructions for providing the MOD item 110 to the user 102. As non-limiting examples, the delivery module 1002 can provide instructions to manufacture the MOD item 110 and deliver the MOD item to an address, to manufacture the MOD item 110 and deliver the MOD item to a pick-up location, or to manufacture the MOD item 110 on a 3D manufacturing apparatus 108 of a user 102. If the parameter (s) are not met (No at 1806), then at 1810, the delivery module 1002 can provide instructions for obtaining the item as a non-MOD item, such as an item previously manufactured before receipt of the order 104. At 1812, the delivery module 1002 can provide instructions for providing the obtained item to the user 102.

Figure 19:
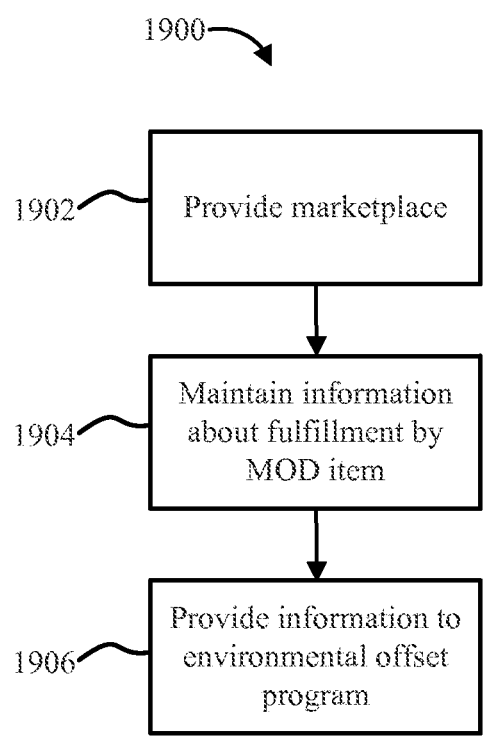
FIG. 19 is a flow chart representing a process that can be executed by a system for associating environmental offsets with suppliers that utilize systems of a service provider to distribute MOD items to users in accordance with embodiments.

Methods can be provided for associating environmental offsets with suppliers 103 that utilize systems of a service provider 101 to distribute MOD items 110 to users 102. FIG. 19 is a flow chart representing a process 1900 that can be executed by a system 200 for associating environmental offsets with suppliers 103 that utilize systems of a service provider 101 to distribute MOD items 110 to users 102. At 1902, the order module 402 can provide items from a plurality of suppliers 103 or vendors for consumption in an electronic marketplace. At 1904, the supplier interface module 602 can maintain information about orders 104 for items that were fulfilled via MOD items 110 on behalf of suppliers 103. The MOD items 110 utilized to fulfill orders 104 can be based on a 3D manufacturing instructions 107 provided by the supplier 103. At 1906, the supplier interface module 602 can provide the information about the fulfillment via MOD items 110 to an environmental offset program. For example, the information may include an evaluation of resources consumed in producing the MOD item 110 used in fulfilling an order 104. The information may also include an evaluation of the resources that would have been consumed had the item been producing in another fashion and not as a MOD item 110. Information provided at 1906 can be provided to an entity administering an environmental offset program, to the supplier 103, to the user 102, other interested parties, or to any combination thereof.

Digital Store for MOD Items

Systems discussed herein may provide various methods for providing services associated with mod items 110. The methods utilized for providing services associated with mod items 110 may affect the functions performed by various modules discussed above. The following discussion of examples of methods for providing services associated with mod items 110 may illustrate ways that such methods may affect the functions performed by previously discussed modules.

Figure 20:
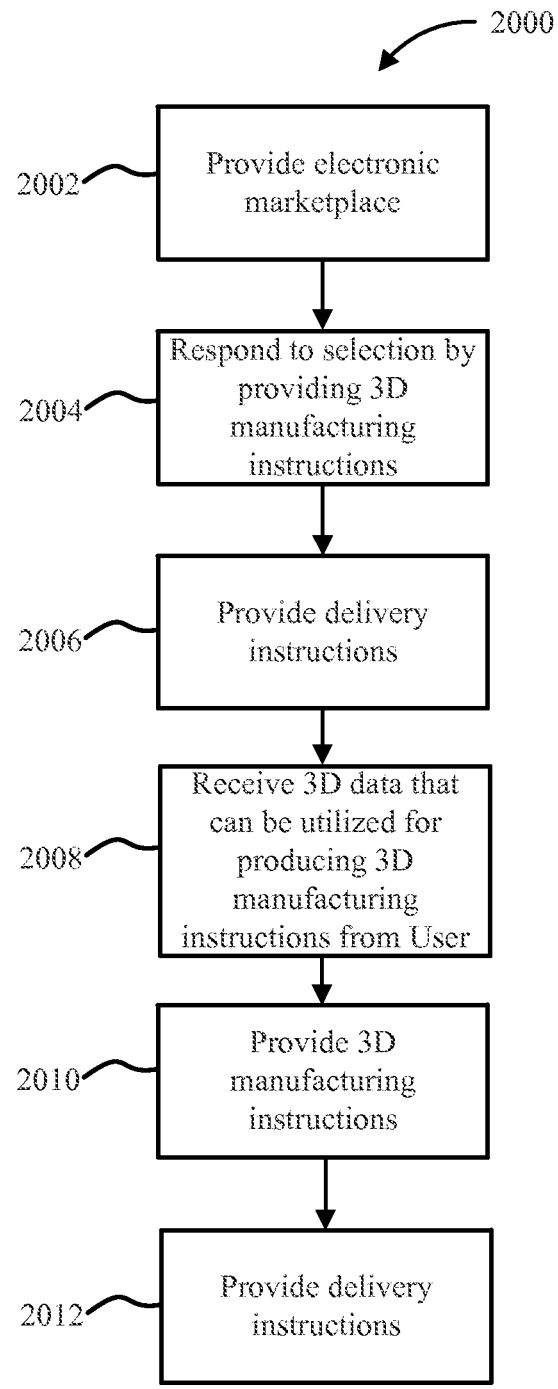
FIG. 20 is a flow chart representing a process that can be executed by a system for providing the designs and 3-Dimensional (3D) manufacturing apparatuses for producing MOD items in accordance with embodiments.

Methods can be provided for providing services associated with MOD items 110. For example, services associated with MOD items 110 may include services that provide the designs and/or 3D manufacturing apparatuses 108 for producing MOD items 110. In some aspects, a user 102 may be interested in services providing both the designs and the use of a 3D manufacturing apparatus 108 for producing MOD items 110. For example, the user 102 may be cost conscious and prefer to peruse ready made designs for production upon request rather than invest time or resources into developing designs or purchasing a 3D manufacturing apparatus 108 for producing a MOD item 110. FIG. 20 is a flow chart representing a process 2000 that can be executed by a system 200 for providing the designs and 3D manufacturing apparatuses 108 for producing mod items 110. At 2002, the order module 402 can provide an electronic marketplace for consumption of a plurality of items. Each of the items can have 3D manufacturing instructions 107 associated with the particular item. For example, a library of designs can be presented to a user 102. These designs may be provided by the service provider 101 and/or one or more suppliers 103. The user 102 may select a design for a MOD item 110 that the user 102 would like produced by a 3D manufacturing apparatus 108 of the service provider 101. At 2004, responsive to selection of one of the items by a user 102, the manufacture module 802 can provide 3D manufacturing instructions 107 to a 3D manufacturing apparatus 108 to manufacture the item based on the 3D manufacturing instructions 107. At 2006, the delivery module 1002 can provide delivery instructions for delivering the manufactured item to the user 102.

In some aspects, a user 102 may be only interested in services providing the use of a 3D manufacturing apparatus 108 for producing MOD items 110. For example, the user 102 may already have designs for producing a MOD item 110 via the 3D manufacturing apparatus 108. As more specific examples, the user 102 may be an engineer with a virtual model of a part that he or she would like to physically manipulate or an architect with a CAD model of a building that he or she would like to convert into a physical model to provide to a client. At 2008, the order module 402 can receive data that can be utilized for producing 3D manufacturing instructions 107 (e.g., a 3D model) from a user 102. The data can be provided by the user 102 via the browser application 206. The data can be associated with a design for a MOD item 110 not available in the plurality of items presented in the electronic marketplace. For example, the data may be a model produced in modeling software by the user 102. In another example, the data may be a model produced by a 3-dimensional scan of an object. At 2010, the manufacture module 802 can provide 3D manufacturing instructions 107 to a 3D manufacturing apparatus 108 to manufacture the item based on the data received at 2008. At 2012, the delivery module 1002 can provide delivery instructions for delivering the MOD item to the user 102.

Figure 21:
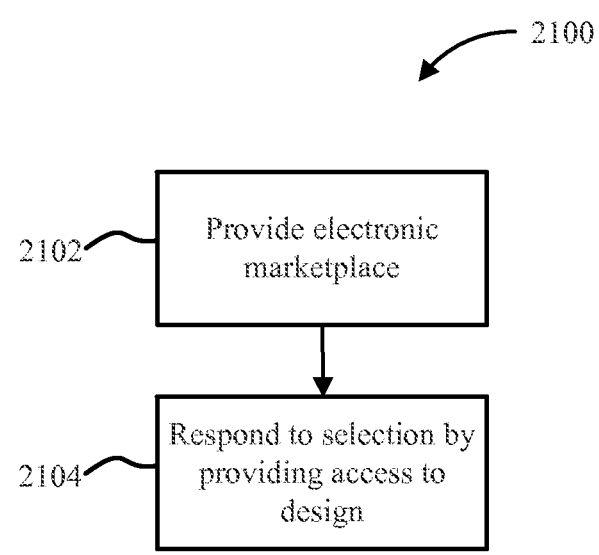
FIG. 21 is a flow chart representing a process that can be executed by a system for providing designs for producing MOD items in accordance with embodiments.

In some aspects, a user 102 may be only interested in designs for producing MOD items 110. For example, the user 102 may already own or control a 3D manufacturing apparatus 108 and may desire to produce a MOD item 110 via that 3D manufacturing apparatus 108. As a more specific example, a user 102 may wish to sample a texture of a fabric before ordering clothing having that fabric. FIG. 21 is a flow chart representing a process 2100 that can be executed by a system 200 for providing designs for producing MOD items 110. At 2102, the order module 402 can provide an electronic marketplace for consumption of a plurality of items. Each of the items can have a separate 3D manufacturing instructions 107 associated with the particular item. For example, a library of designs can be presented to a user 102. The user 102 may select a design for a MOD item 110 that the user 102 would like to produce on the user's 3D manufacturing apparatus 108. At 2104, responsive to selection of one of the items by a user 102, the delivery module 1002 can provide to the user 102 with access to the design. For example, the delivery module 1002 may provide the user 102 with access to the 3D manufacturing instructions 107 associated with the selected item such that the user 102 can use the 3D manufacturing instructions 107 in a 3D manufacturing apparatus 108 to manufacture the selected item as a MOD item 110. In some aspects, the user's access to the design is limited. For example, the user's access to the design may be limited by rights management mechanisms, such as permission restrictions that limit use of the design to a certain time window and/or to a certain number of uses. For example, the access to the design may be limited to a single use or to an amount of time based on an estimated amount of time for the manufacturing apparatus 108 of the user 102 to produce a MOD item 110 from the design. As another example, the access to the design may be limited to use initiated within a certain window (e.g., 24 hours after access is first granted). In some aspects, the user's access to the design is limited by providing executable code for producing the design on the user's 3D manufacturing apparatus 108 rather than providing the design code. In some aspects, data encryption can secure design data and/or prevent improper copying.

Figure 22:
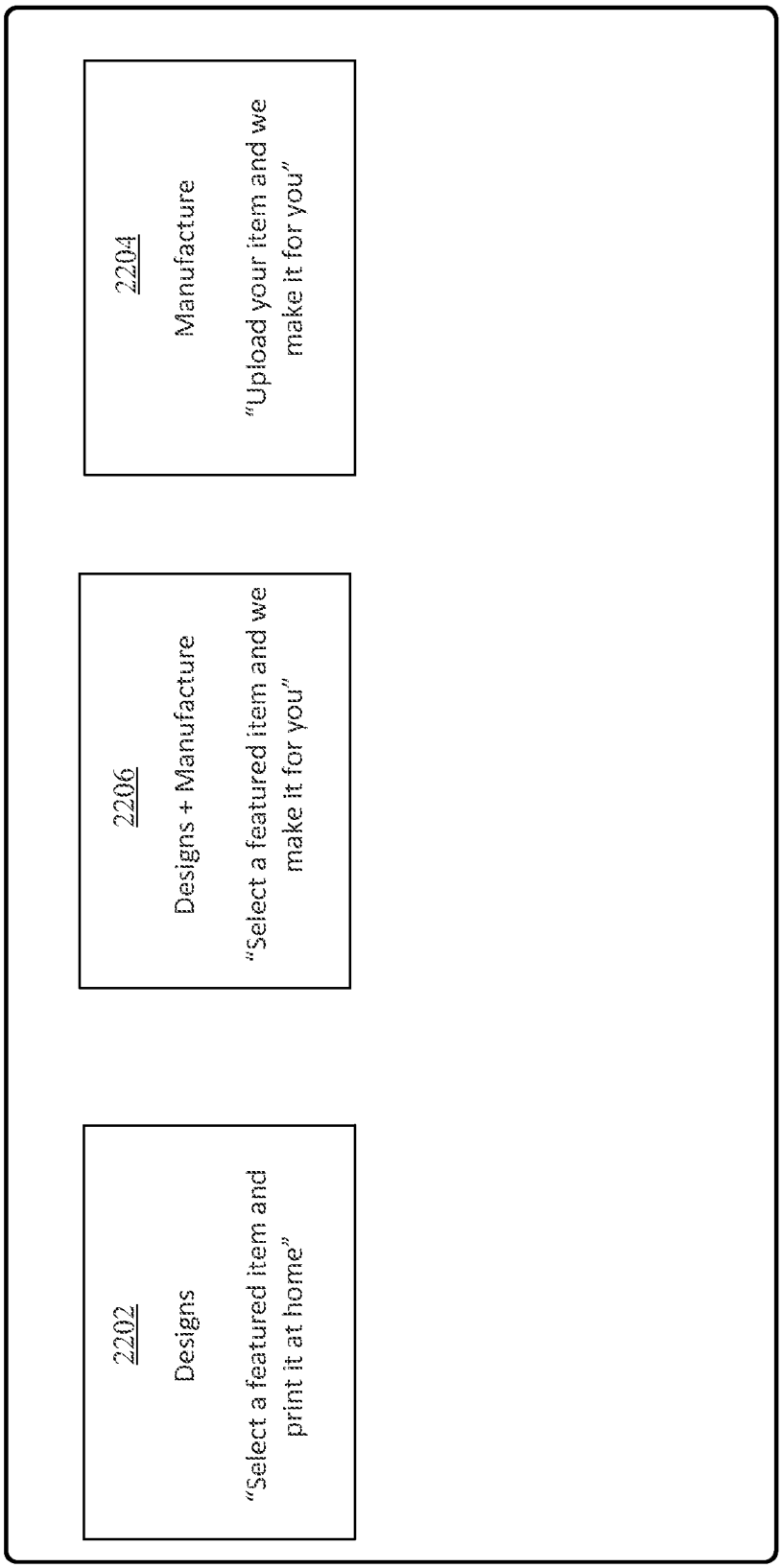
FIG. 22 illustrates an example of a network page providing options for selecting design services, 3D manufacturing services, and/or design and 3D manufacturing services in accordance with embodiments.

In some aspects, one or more of the services discussed above (providing designs, providing 3D manufacturing services, or providing designs and 3D manufacturing services) can be presented to a user 102. FIG. 22 is an example network page 2200 providing options for selecting design services 2202, 3D manufacturing services 2204, and/or design and 3D manufacturing services 2206.

Electronic Marketplace for MOD Items

Systems discussed herein may provide various methods for providing an electronic marketplace in which providing a MOD item 110 is one of multiple options for fulfilling an order 104 for an item. The methods utilized for providing an electronic marketplace in which providing a MOD item 110 is one of multiple options for fulfilling an order 104 for an item may affect the functions performed by various modules discussed above. The following discussion of examples of methods for providing an electronic marketplace in which providing a MOD item 110 is one of multiple options for fulfilling an order 104 for an item may illustrate ways that such methods may affect the functions performed by previously discussed modules.

Figure 23:
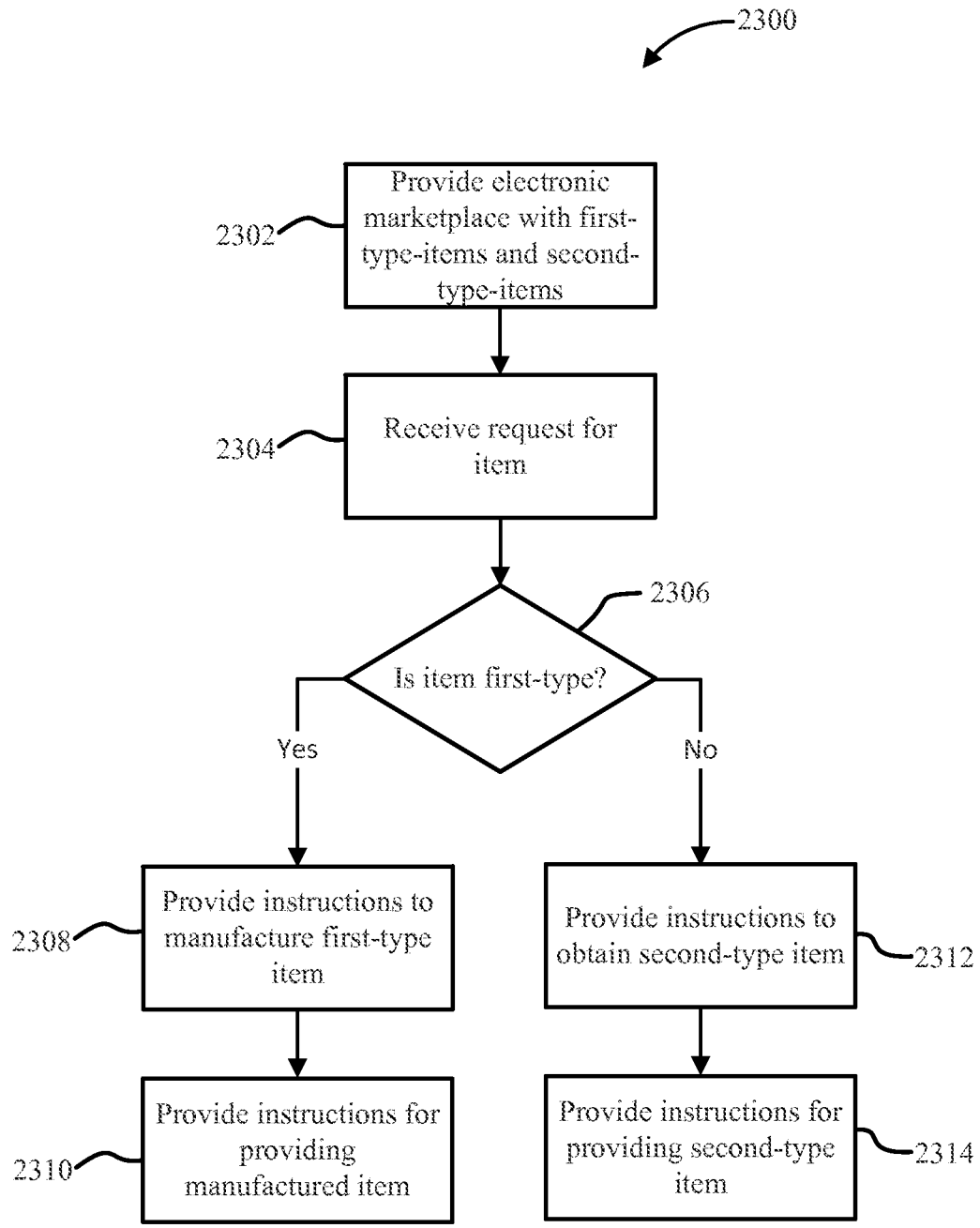
FIG. 23 is a flow chart representing a process that can be executed by a system for providing an electronic marketplace in which providing a MOD item is one of multiple options for fulfilling an order for an item in accordance with embodiments.

Methods can be provided for providing an electronic marketplace in which providing a MOD item 110 is one of multiple options for fulfilling an order 104 for an item. FIG. 23 is a flow chart representing a process 2300 that can be executed by a system 200 for providing an electronic marketplace in which providing a MOD item 110 is one of multiple options for fulfilling an order 104 for an item. At 2302, the order module 402 can provide an electronic market place with items for consumption. Each item in the electronic marketplace can be designated as either a first-type item or a second-type item. The first-type items can be designated for production as a MOD item 110. The second-type items can be designated not for production as MOD items 110. At 2304, the order module 402 can receive a request for an item. The item may be either a first-type item or a second type item. If the requested item is a first-type item (YES at 2306), then at 2308 the manufacture module 802 can provide instructions to manufacture the first-type item as a MOD item 110. At 2310, the delivery module 1002 can provide instructions for providing the manufactured first-type item. For example, the delivery module 1002 may provide instructions that the manufactured item be provided via a 3D manufacturing apparatus 108 of a user 102, or instructions that the manufactured item be provided via a 3D manufacturing apparatus 108 of the service provider 101 and delivered to the user 102. If the requested item is a second-type item (NO at 2306), then at 2312, the order module 402 can provide instructions for obtaining the second-type item. At 2314, the delivery module 1002 can provide instructions for providing the obtained second-type item.

Figure 24:
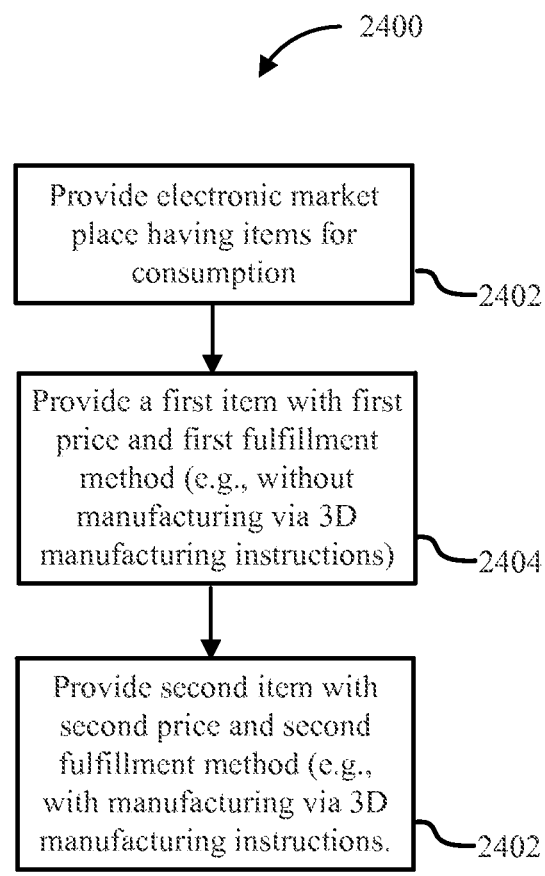
FIG. 24 is a flow chart representing a process that can be executed by a system for providing an electronic marketplace in which ordering an item as a MOD item is an option on an item detail page in accordance with embodiments.

Methods can be provided for providing an electronic marketplace in which ordering an item as a MOD item 110 is an option on an item detail page. FIG. 24 is a flow chart representing a process 2400 that can be executed by a system 200 for providing an electronic marketplace in which ordering an item as a MOD item 110 is an option on an item detail page. At 2402, the order module 402 can provide an electronic market place with items for consumption. At 2404, the electronic marketplace can provide at least a first item associated with a first price and a first fulfillment method. The first fulfillment method can be completed without manufacturing the first item based on 3D manufacturing instructions 107. For example, the first fulfillment method can involve providing the item as a non-MOD item. At 2406, the electronic marketplace can provide a second item associated with a second price and a second fulfillment method. The second fulfillment method can involve manufacturing the second item based on 3D manufacturing instructions 107. For example, the second fulfillment method can involve providing the item as a MOD item 110.

Figure 25:
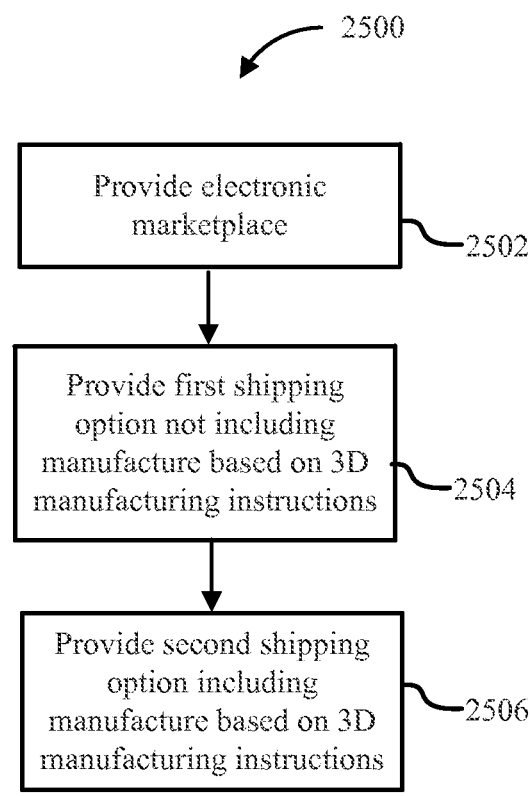
FIG. 25 is a flow chart representing a process that can be executed by a system providing an electronic marketplace in which ordering an item as a MOD item is a shipping option in accordance with embodiments.

Methods can be provided for providing an electronic marketplace in which ordering an item as a MOD item 110 is a shipping option. FIG. 25 is a flow chart representing a process 2500 that can be executed by a system 200 providing an electronic marketplace in which ordering an item as a MOD item 110 is a shipping option. At 2502, order module 402 can provide an electronic market place with items for purchase. At 2504, responsive to a purchase of an item in the electronic marketplace, the order module 402 can provide a first delivery option not including manufacturing the purchased item based on 3D manufacturing instructions 107. At 2506, a second delivery option can be provided including manufacturing the purchased item based on 3D manufacturing instructions 107.

Figure 26:
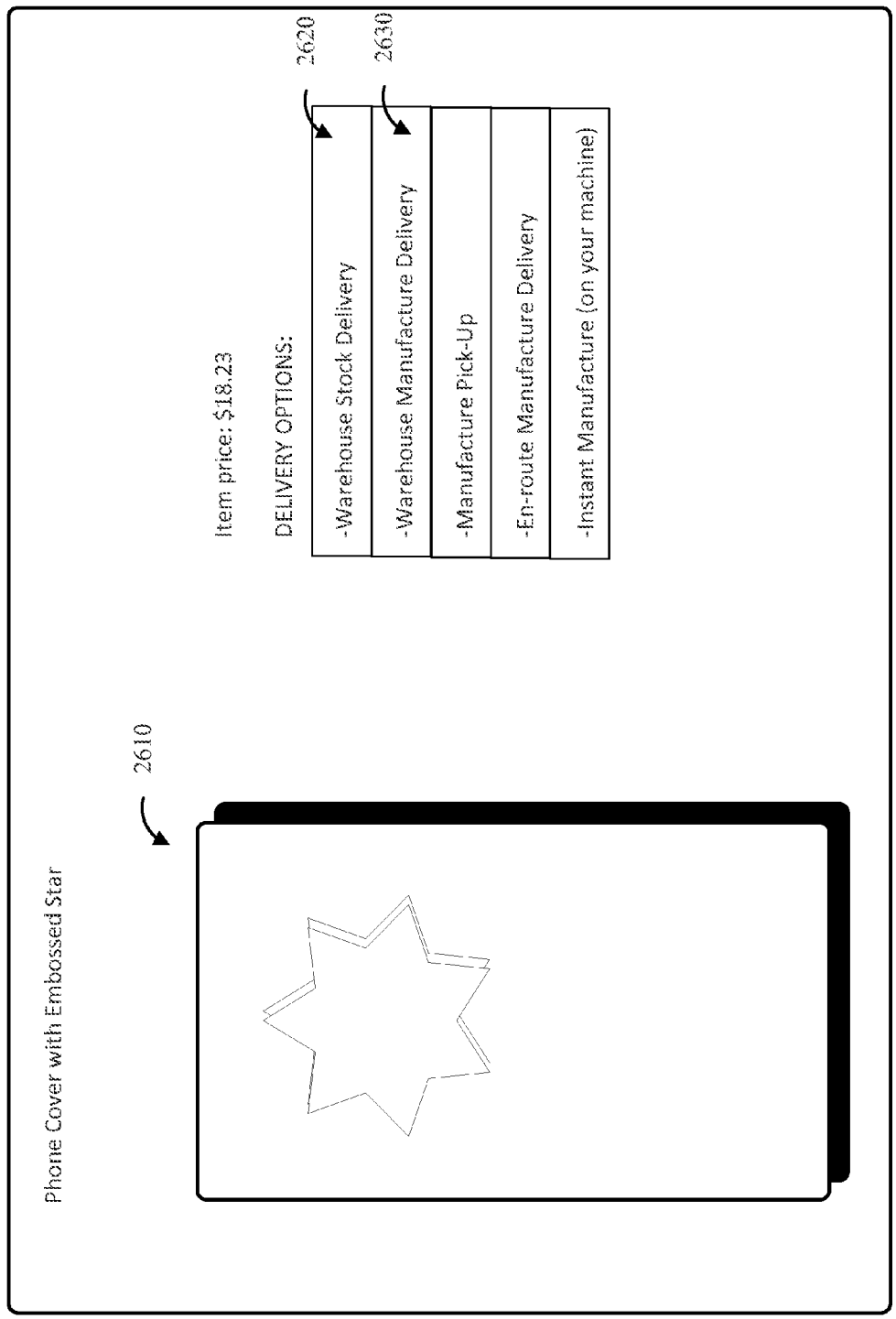
FIG. 26 illustrates an example of a network page showing a shipping page for a purchased item showing a first delivery option not including manufacturing the purchased item based on 3D manufacturing instructions and a second delivery option including manufacturing the purchased item based on 3D manufacturing instructions in accordance with embodiments.

FIG. 26 is an example network page showing a shipping page 2600 for a purchased item 2610 showing a first delivery option 2620 not including manufacturing the purchased item based on 3D manufacturing instructions 107 and a second delivery option 2630 including manufacturing the purchased item based on 3D manufacturing instructions 107.

Figure 27:
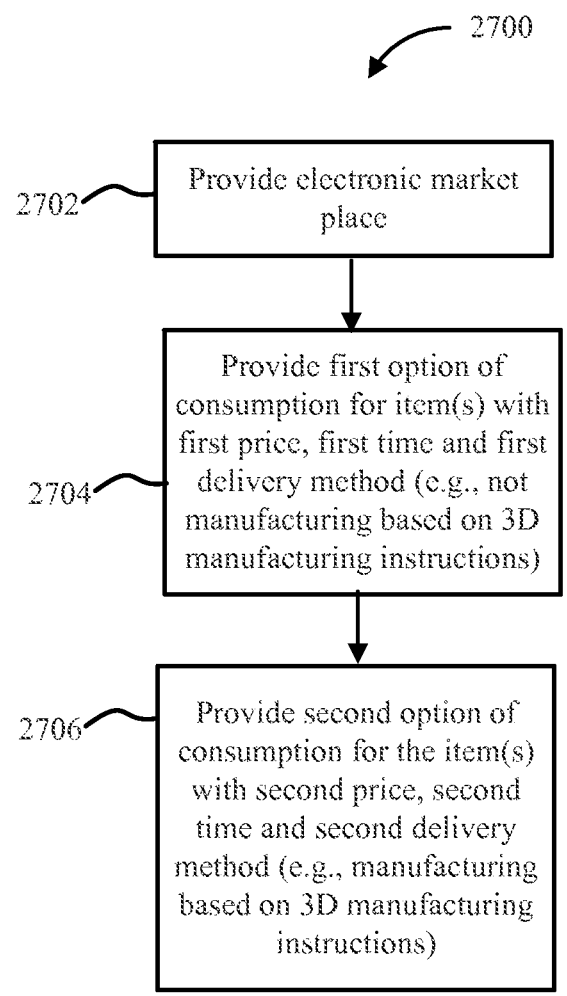
FIG. 27 is a flow chart representing a process that can be executed by a system for providing an electronic marketplace in which ordering an item as a MOD item is an option associated with a time and/or cost in accordance with embodiments.

Methods can be provided for providing an electronic marketplace in which ordering an item as a MOD item 110 is an option associated with a time and/or cost. FIG. 27 is a flow chart representing a process 2700 that can be executed by a system 200 for providing an electronic marketplace in which ordering an item as a MOD item 110 is an option associated with a time and/or cost. At 2702, the order module 402 can provide an electronic market place with items for consumption. At 2704, the electronic marketplace can provide at least one item having a first option for consumption. At 2706, the electronic marketplace can provide a second option for consumption of the at least one item. The first option can be associated with a first price, a first time of delivery, and a first delivery method not involving manufacturing the first item based on 3D manufacturing instructions 107. The second option can be associated with a second price, a second time of delivery, and a second delivery method involving manufacturing the second item based on 3D manufacturing instructions 107.

Figure 28:
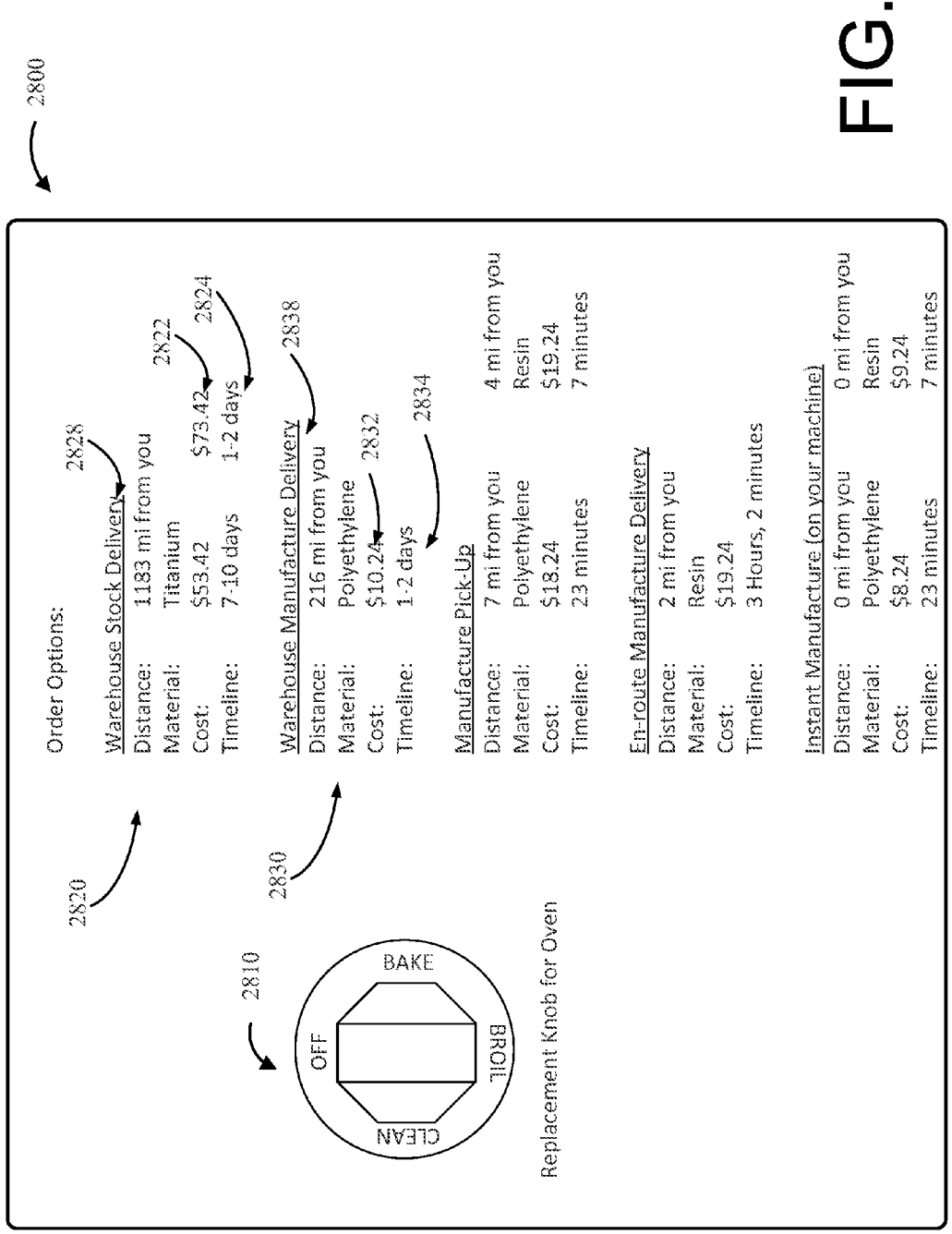
FIG. 28 illustrates an example of a network page showing an item detail page for an item showing a first option associated with a first price, a first time of delivery, and a first delivery method not involving manufacturing the first item based on 3D manufacturing instructions and second option associated with a second price, a second time of delivery, and a second delivery method involving manufacturing the second item based on 3D manufacturing instructions in accordance with embodiments.

FIG. 28 is an example network page showing an item detail page 2800 for an item 2810 showing a first option 2820 associated with a first price 2822, a first time of delivery 2824, and a first delivery method 2828 not involving manufacturing the first item based on 3D manufacturing instructions 107 and second option 2830 associated with a second price 2832, a second time of delivery 2834, and a second delivery method 2838 involving manufacturing the second item based on 3D manufacturing instructions 107.

As can be seen from the above examples, embodiments herein can provide an electronic marketplace with a number of options for delivery of an item, including allowing a selection of manufacturing via a 3D manufacturing apparatus or not, selecting where an item is manufactured (if that option is selected), and selecting a speed of delivery. These options may be provided with different pricing options, as shown in FIG. 28. Thus, 3D manufacturing can provide a user 102 with a variety of options including very fast delivery.

Figure 29:
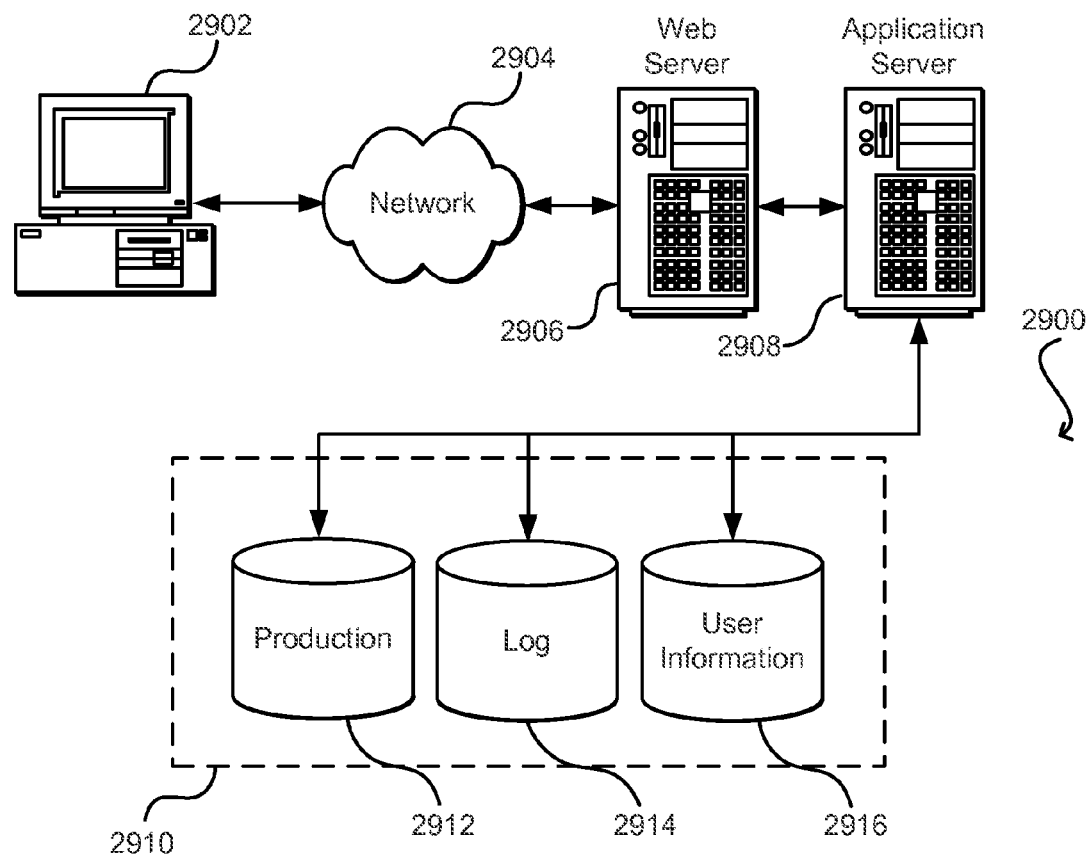
FIG. 29 illustrates an environment in which various embodiments can be implemented.

FIG. 29 illustrates aspects of an example environment 2900 for implementing aspects in accordance with various embodiments. As will be appreciated, although a Web-based environment is used for purposes of explanation, different environments may be used, as appropriate, to implement various embodiments. The environment includes an electronic client device 2902, which can include any appropriate device operable to send and receive requests, messages or information over an appropriate network 2904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 2906 for receiving requests and serving content in response thereto, although for other networks an alternative device serving a similar purpose could be used as would be apparent to one of ordinary skill in the art.

The illustrative environment includes at least one application server 2908 and a data store 2910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 2902 and the application server 2908, can be handled by the Web server. It should be understood that the Web and application servers are not required and are merely example components, as structured code discussed herein can be executed on any appropriate device or host machine as discussed elsewhere herein.

The data store 2910 can include several separate data tables, databases or other data storage mechanisms and media for storing data relating to a particular aspect. For example, the data store illustrated includes mechanisms for storing production data 2912 and user information 2916, which can be used to serve content for the production side. The data store also is shown to include a mechanism for storing log data 2914, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 2910. The data store 2910 is operable, through logic associated therewith, to receive instructions from the application server 2908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the client device 2902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 29. Thus, the depiction of the system 2900 in FIG. 29 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium, which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system, comprising:
one or more processor devices; and
memory including instructions executable by the one or more processor devices that, when executed by the one or more processor devices, cause the system to at least:
provide, in an electronic marketplace, information about a plurality of items available via the electronic marketplace from a plurality of suppliers, each item having 3D manufacturing instructions associated therewith, wherein the 3D manufacturing instructions are accessible to the electronic marketplace, the 3D manufacturing instructions being associated with at least a virtual model defining a three-dimensional representation of the item;
receive a request from a user for an item from the plurality of items available in the electronic marketplace;
determine, from the request, a delivery method for the item that includes manufacture of the item based at least in part on the 3D manufacturing instructions, wherein determining the delivery method for the item further comprises determining a storage location for the item;
select a 3D manufacturing apparatus to manufacture the item based at least in part on the delivery method for the item, wherein selecting the 3D manufacturing apparatus to manufacture the item comprises selecting a manufacturing apparatus located at the storage location;
validate the virtual model based at least in part on a simulation of at least one environmental condition;
send, responsive to the validation, the 3D manufacturing instructions associated with the virtual model to the selected 3D manufacturing apparatus, wherein receipt of the 3D manufacturing instructions causes the selected 3D manufacturing apparatus to manufacture the item based at least in part on the 3D manufacturing instructions associated with the item; and
execute instructions that cause the item to be delivered according to the delivery method, wherein executing the delivery instructions that cause the item to be delivered comprises generating instructions to store the item at the storage location after manufacturing the item at the storage location.

2. The system of claim 1, wherein the determined delivery method includes delivery via a 3D manufacturing apparatus of a service provider, wherein the selected 3D manufacturing apparatus comprises a 3D manufacturing apparatus of the service provider.

3. The system of claim 1, wherein the request is received at a kiosk at which a user can generate the request, the kiosk having a manufacturing apparatus associated therewith;
wherein determining a delivery method for the item comprises selecting manufacture of the item at the manufacturing apparatus associated with the kiosk; and
wherein selecting the 3D manufacturing apparatus to manufacture the item comprises selecting the manufacturing apparatus associated with the kiosk.

4. The system of claim 3, wherein receiving the request comprises associating the request with a user account associated with the electronic marketplace.

5. The system of claim 1, wherein the electronic marketplace presents an assembly comprising a plurality of subcomponents; and wherein receiving the request comprises receiving an item selection including a subcomponent of the plurality of subcomponents.

6. The system of claim 1, further comprising:
receiving a user preference associated with one or more delivery methods; and
wherein determining the delivery method comprises selecting the delivery method from the one or more delivery methods based at least in part upon the preference of the user.

7. The system of claim 1, further comprising: determining a cost associated with one or more delivery methods; and
wherein determining the delivery method for the item comprises selecting the delivery method from the one or more delivery methods based at least upon the cost.

8. The system of claim 1, further comprising: determining a time associated with one or more delivery methods; and
wherein determining the delivery method for the item comprises selecting the delivery method from the one or more delivery methods based at least upon the time.

9. A computer-implemented method comprising:
receiving, by a computing device, a user request for an item, the item having 3D manufacturing instructions associated therewith, the 3D manufacturing instructions being associated with at least a virtual model defining a three-dimensional representation of the item;
identifying, by the computing device, location information for the user;
determining, by the computing device, a delivery method for the item that includes manufacture of the item based at least in part on the 3D manufacturing instructions associated with the virtual model, wherein determining the delivery method for the item further comprises determining a storage location for the item accessible by the user;
selecting, by the computing device, a 3D manufacturing apparatus to manufacture the item, based at least in part on the identified location information of the user, wherein selecting the 3D manufacturing apparatus to manufacture the item comprises selecting a manufacturing apparatus located at the storage location;

validating, by the computing device, the virtual model based at least in part on a simulation of at least one environmental condition;

sending, by the computing device responsive to the validation, the 3D manufacturing instructions to the selected 3D manufacturing apparatus to cause manufacture of the item by the 3D manufacturing apparatus based at least in part on the 3D manufacturing instructions; and executing instructions that cause the item to be stored at the storage location accessible by the user.

10. The computer-implemented method of claim 9, further comprising: generating a notification for the user, wherein the notification includes storage location information for the storage location.

11. The computer-implemented method of claim 9, further comprising: generating a notification for the user, wherein the notification includes access information for accessing the item at the storage location.

12. The computer-implemented method of claim 9, further comprising: generating a notification for the user, wherein the notification includes information associated with an availability of the item at the storage location.

13. A non-transitory computer-readable medium storing computer executable instructions that, when executed by one or more computer systems, configure the one or more computer systems to implement at least:

provide, in an electronic marketplace, information about a plurality of items available via the electronic marketplace from a plurality of suppliers, each item having 3D manufacturing instructions associated therewith, the 3D manufacturing instructions being associated with at least a virtual model defining a three-dimensional representation of the item and being accessible to the electronic marketplace;

receive a request from a user for an item from the plurality of items available in the electronic marketplace;

determine, from the request, a delivery method for the item that includes manufacture of the item based at least in part on the 3D manufacturing instructions;

select a 3D manufacturing apparatus to manufacture the item based at least in part on the delivery method for the item, the 3D manufacturing apparatus being selected from a plurality of mobile 3D manufacturing apparatuses, the selection being based at least in part on an amount of time associated with manufacturing the item based on the 3D manufacturing instructions via the selected 3D manufacturing apparatus and a delivery location;

validate the virtual model based at least in part on a simulation of at least one environmental condition;

send, responsive to the validation, the 3D manufacturing instructions to the selected 3D manufacturing apparatus, wherein receipt of the 3D manufacturing instructions causes the selected 3D manufacturing apparatus to manufacture the item based at least in part on the 3D manufacturing instructions associated with the item; and execute instructions that cause the item to be delivered according to the delivery method.

14. The non-transitory computer-readable medium of claim 13, wherein determining the delivery method is further based at least in part upon a cost associated with the delivery method that includes manufacturing the item via the 3D manufacturing apparatus.

15. The non-transitory computer-readable medium of claim 13, storing further computer executable instructions that, when executed by one or more computer systems, configure the one or more computer systems to implement at least generate delivery instructions for transporting the item to the delivery location.

16. The non-transitory computer-readable medium of claim 13, wherein selecting the 3D manufacturing apparatus to manufacture the item is further based at least in part upon an amount of deviation from a route of the selected 3D manufacturing apparatus, wherein the amount of deviation is associated with manufacturing the item based on the 3D manufacturing instructions via the selected 3D manufacturing apparatus and transporting the item to the delivery location.

* * * * *